(12) United States Patent
Wong et al.

(10) Patent No.: US 10,783,116 B2
(45) Date of Patent: Sep. 22, 2020

(54) SYSTEMS AND METHODS FOR MANAGING DATA

(71) Applicant: ROYAL BANK OF CANADA, Montreal (CA)

(72) Inventors: Michael C. Wong, Toronto (CA); Philip Vitorino, Oakville (CA); Hisham Abu-Abed, Toronto (CA); Mohammad Rifaie, Toronto (CA); Masood Ali, Toronto (CA); Mark Nieuwland, Hamilton (CA); Spencer Chui, Richmond Hill (CA); Gang Liao, Toronto (CA); Gitasree Das, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 642 days.

(21) Appl. No.: 15/067,162

(22) Filed: Mar. 10, 2016

(65) Prior Publication Data
US 2016/0267082 A1    Sep. 15, 2016

Related U.S. Application Data

(60) Provisional application No. 62/130,955, filed on Mar. 10, 2015.

(51) Int. Cl.
*G06F 7/00* (2006.01)
*G06F 16/16* (2019.01)

(52) U.S. Cl.
CPC ................... *G06F 16/164* (2019.01)

(58) Field of Classification Search
CPC ..................................................... G06F 16/164

USPC ........................................................ 707/600
See application file for complete search history.

(56) References Cited

U.S. PATENT DOCUMENTS

| 5,339,421 A | * | 8/1994 | Housel, III | G06F 9/54 719/328 |
| 5,668,948 A | * | 9/1997 | Belknap | H04H 20/42 709/231 |
| 7,007,208 B1 | * | 2/2006 | Hibbert | H04L 1/24 341/51 |

(Continued)

OTHER PUBLICATIONS

WIPO, International Search Report and Written Opinion for PCT Application No. PCT/CA2016/050268 dated May 18, 2016.

*Primary Examiner* — Eliyah S. Harper
(74) *Attorney, Agent, or Firm* — Norton Rose Fulbright Canada LLP

(57) ABSTRACT

Systems, methods and non-transitory computer readable media may be provided for the management of data related to risk exposure. A system may be provided including one or more utilities configured to receive data from a plurality of data sources; a rules engine for applying one or more logical rules that are triggered by one or more conditions associated with the integrity of the received data; and one or more utilities configured to apply the one or more logical rules to validate received data and automatically request updated data from a subset of the plurality of data sources where the integrity of the received data does not meet a predefined threshold. Other systems may be provided including units configured for the determination of risk exposure, and the identification of a tiered risk exposure analysis. Corresponding methods and non-transitory computer readable media may be provided.

16 Claims, 53 Drawing Sheets

(56) References Cited

U.S. PATENT DOCUMENTS

| | | | | |
|---|---|---|---|---|
| 7,356,622 | B2* | 4/2008 | Hattrup | G06F 3/0661 |
| | | | | 710/33 |
| 8,478,800 | B1* | 7/2013 | Johnson | G06F 16/904 |
| | | | | 707/827 |
| 2002/0156792 | A1 | 10/2002 | Gombocz et al. | |
| 2003/0188035 | A1* | 10/2003 | Lubbers | H04L 67/1095 |
| | | | | 719/310 |
| 2005/0022254 | A1 | 1/2005 | Adolph et al. | |
| 2005/0132070 | A1* | 6/2005 | Redlich | G06F 21/6209 |
| | | | | 709/228 |
| 2005/0182777 | A1 | 8/2005 | Block et al. | |
| 2005/0257051 | A1* | 11/2005 | Richard | G06F 16/90 |
| | | | | 713/165 |
| 2006/0173985 | A1 | 8/2006 | Moore | |
| 2008/0065668 | A1 | 3/2008 | Spence et al. | |
| 2008/0288441 | A1* | 11/2008 | Lee | G06F 16/334 |
| 2009/0178144 | A1* | 7/2009 | Redlich | G06F 21/6209 |
| | | | | 726/27 |
| 2011/0119274 | A1 | 5/2011 | Clayton et al. | |
| 2014/0019542 | A1* | 1/2014 | Rao | G06Q 30/0269 |
| | | | | 709/204 |

\* cited by examiner

|  | 8/30/2013 | 10/30/2014 |
|---|---|---|
| BRR | Current Exposure | Current Exposure |
| 1+/1 | 24,245 | 24,245 |
| 2 | 53,513 | 53,513 |
| 2+ | 40,126 | 40,126 |
| 2- | 29,603 | 29,603 |
| 3+/3 | 50,310 | 50,310 |
| 4 | 28,218 | 28,218 |
| 5/6 | 568 | 568 |
|  | 798 | 798 |
| Grand Total | 227,382 | 227,382 |

Analyze · Refresh · Print · Export · Copy

FIG. 34

| Remaining Term | 8/30/2013 Current Exposure | 10/30/2014 Current Exposure |
|---|---|---|
| <2 Yrs | 48,235 | 48,235 |
| 2-5 Yrs | 47,933 | 47,933 |
| >5 Yrs | 10,076 | 10,076 |
| Other | 121,138 | 121,138 |
| Grand Total | 227,382 | 227,382 |

Analyze - Refresh - Print - Export - Copy

Exposure By Borrower

| Borrower | EID | SKF# | Borrower Risk Rating | Current Exposure($) | Maximum Exposure($) | Transactional Risk Amount($) |
|---|---|---|---|---|---|---|
| ENTITY_NAME 1180770 | 1180770 | 957358856 | 2+L | 0.00 | 0.00 | 0.00 |
| ENTITY_NAME 1207528 | 1207528 | 0 | 2+H | 0.00 | 0.00 | 0.00 |
| ENTITY_NAME 16697 | 16697 | 802284696 | 2+H | 120,489,563.82 | 199,999,999.99 | 0.00 |
| ENTITY_NAME 16816 | 16816 | 829764299 | 2+H | 0.00 | 0.00 | 0.00 |
| ENTITY_NAME 16817 | 16817 | 802406682 | 2+H | 0.00 | 185,823,529.23 | 0.00 |
| ENTITY_NAME 16818 | 16818 | 802389197 | 2+H | 0.00 | 185,823,529.23 | 0.00 |
| ENTITY_NAME 16819 | 16819 | 802388880 | 2+H | 99,879,000.00 | 560,758,067.23 | 0.00 |
| ENTITY_NAME 16820 | 16820 | 802384909 | 2+H | 0.00 | 0.00 | 0.00 |
| ENTITY_NAME 16821 | 16821 | 776183095 | 2+H | 520,000.00 | 633,781,462.03 | 0.00 |
| ENTITY_NAME 16822 | 16822 | 777780769 | 2+H | 3,500.00 | 3,003,500.00 | 0.00 |
| ENTITY_NAME 16823 | 16823 | 747221638 | 2+L | 0.00 | 3,000,000.00 | 0.00 |
| ENTITY_NAME 16824 | 16824 | 686088675 | 3L | 0.00 | 5,000,000.00 | 0.00 |
| ENTITY_NAME 16825 | 16825 | 629833229 | 2+L | 422,794.47 | 17,000,000.00 | 0.00 |
| ENTITY_NAME 285028 | 285028 | 854802715 | 2+H | 0.00 | 0.00 | 0.00 |
| ENTITY_NAME 285029 | 285029 | 0 | 2+H | 0.00 | 0.00 | 0.00 |
| ENTITY_NAME 285036 | 285036 | 0 | 2+H | 0.00 | 0.00 | 0.00 |
| ENTITY_NAME 302410 | 302410 | 854802634 | 2+H | 0.00 | 37,164,705.36 | 0.00 |
| ENTITY_NAME 493263 | 493263 | 193631306 | 2+H | 0.00 | 50,000.00 | 0.00 |
| ENTITY_NAME 493701 | 493701 | 192007469 | 2H | 0.00 | 0.00 | 0.00 |
| ENTITY_NAME 530238 | 530238 | 194238150 | 2+H | 0.00 | 18,582,352.37 | 0.00 |
| ENTITY_NAME 530239 | 530239 | 194238598 | 2+M | 0.00 | 18,582,352.37 | 0.00 |
| ENTITY_NAME 681494 | 681494 | 0 | | 4,654,704.24 | 5,000,000.00 | 0.00 |
| ENTITY_NAME 726473 | 726473 | 0 | | 0.00 | 0.00 | 0.00 |
| Grand Total | | | | 225,969,562.53 | 1,873,569,497.87 | 0.00 |

Print - Export

SYSTEMS AND METHODS FOR MANAGING DATA

CROSS REFERENCE

This application claims all benefit, including priority of, U.S. Application No. 62/130,955, entitled "SYSTEMS AND METHODS FOR MANAGING DATA" and filed on Mar. 10, 2015, incorporated herein by reference.

FIELD

Improvements generally relate to the field of data management.

INTRODUCTION

The management of large volumes of data received from a variety of sources may be problematic from the perspective of conducting analyses on the data, as well as the generation of reports.

Using conventional systems, there is be a need to manually subscribe to data, acquire data, process data (clean, map etc.). The manual activities required have led to inefficiencies as there may be less time for conducting actual analyses. Organizations that are interested in monitoring risk generally use conventional data warehousing systems.

Determining data quality, in particular, is a time-consuming activity and may be difficult assess reliably, and was unknown in conventional systems. There are be issues with the quality and/or timeliness of the data received, which may impact the quality of analysis and reporting, as well as reduce the reliability and/or confidence in the underlying data.

For example, it is desirable to be able to prepare an infrastructure for supporting reporting and analytics queries on a frequent basis (e.g., overnight, so that it is ready in the morning). However, computation resources are limited and processing the information to prepare it in a form ready for running queries (e.g., normalization, indexing, transformation) may take some time. This issue scales up as larger and more complex volumes of data are received.

Another challenge arises when data arrives in a potentially incomplete and/or inaccurate form. Where the data does not have a sufficiently high quality, the loading of data is often delayed as it may be undesirable to load untrustworthy data into a data warehouse.

SUMMARY

In an aspect, there is provided an apparatus adapted for processing high volumes of data and generating insights within a pre-determined timeframe, the apparatus comprising: a data repository configured to maintain and store a set of metadata tags relating to a set of electronic data, the set of metadata tags including one or more metadata tags that are linked together to form a matrix structure that enables the generation of data integrity reports and enables automated decision making based on tracked data integrity; a data acquisition and importation unit configured to obtain, from a plurality of data streams associated with a plurality of data sources, the set of electronic data wherein two or more of the data streams arrive at different times and have different data quality characteristics; the data acquisition and importation unit further configured to receive a set of data processing rules, the set of data processing rules establishing one or more data validation conditions, each of the data validation conditions corresponding to at least one of the data streams or data sources; a data integrity verification processor configured to, in real or near-real time, apply the set of data processing rules to the set of electronic data, by processing each datum of the set of electronic data to determine whether the one or more data validation conditions for the corresponding data stream or the corresponding data source is met; the data integrity verification processor further configured to, upon a determination that one or more datum of the set of electronic data fails to meet at least one of the one or more data validation conditions, generate the one or more metadata tags indicative of low data quality linked to the one or more datum of the set of electronic data that fails to meet at least one of the one or more data validation conditions, and to store the one or more metadata tags on the data repository; and a batch processing control unit configured to generate and transmit one or more control commands based at least on the matrix structure formed of the set of metadata tags.

In another aspect, the one or more data validation conditions include at least one of (i) a threshold to be met to establish data completeness, (ii) a set of required data objects, (iii) a matching hash checksum, (iv) a set of required data elements, (v) a set of required header information, (vi) a set of required data formatting requirements, and (vii) a specified time in which the datum should have received by the data acquisition and importation unit.

In another aspect, the data repository is further configured to maintain a data inventory of expected electronic data from each of the plurality of data streams, and the one or more data validation conditions include comparing the received set of electronic data with the data inventory for ensuring that each datum of the set of electronic data from a corresponding data stream of the plurality of data streams is present.

In another aspect, the data inventory further includes at least one of (i) a set of required data objects, (ii) a matching hash checksum, (iii) a set of required data elements, (iv) a set of required header information, (v) a set of required data formatting requirements, and (vi) a specified time in which the datum should have received by the data acquisition and importation unit.

In another aspect, each metadata tag of the one or more metadata tags generated by the data integrity verification processor includes data elements representative of: (i) the one or more data validation conditions that the datum corresponding to the metadata tag failed to meet, (ii) the data stream from which the datum was obtained, and (iii) the data source from which the datum was obtained.

In another aspect, each metadata tag of the one or more metadata tags generated by the data integrity verification processor further includes a machine-readable instruction set including instructions for automatically requesting re-retrieval of the datum from the corresponding data source from which the data was initially obtained.

In another aspect, the apparatus further includes an analytics unit adapted for generating one or more data integrity notifications based at least on a processing of the matrix structure formed of the one or more metadata tags.

In another aspect, the apparatus further includes an analytics unit adapted for generating the one or more data integrity reports based at least on a processing of the matrix structure formed of the one or more metadata tags, the one or more data integrity reports including at least one or more recommendations for rectifying data integrity issues identified based at least on a traversal of the matrix structure.

In another aspect, the one or more control commands include machine-readable instructions adapted to load a subset of the electronic data into a data warehouse, the subset of electronic data including only the data that is not linked with the one or more metadata tags indicative of low data quality.

In another aspect, the one or more control commands further includes machine-readable instructions adapted to, for each datum of the set of electronic data that is linked with the one or more metadata tags indicative of low data quality, load a corresponding datum obtained from a data storage maintaining prior sets of electronic data successfully loaded to the data warehouse, the corresponding datum indicative of a last successfully loaded datum from a corresponding data stream of a data source from which the datum was obtained from.

In another aspect, the one or more control commands further includes machine-readable instructions adapted to, following the load of the subset of electronic data into the data warehouse, transmit a request to the plurality of data sources requesting re-transmission of a second subset of electronic data, the second subset of electronic data including only the data that are linked with the one or more metadata tags indicative of low data quality.

In another aspect, the apparatus further comprises an analytics unit configured for generating the one or more data integrity reports based at least on a processing of the matrix structure formed of the one or more metadata tags, the one or more data integrity reports including at least one or more recommendations for rectifying data integrity issues based at least on a traversal of the matrix structure; and an interface layer configured for displaying the one or more data integrity reports to one or more users.

In another aspect, the one or more data integrity reports include a listing of the subset of the electronic data into a data warehouse loaded to the data warehouse.

In another aspect, the one or more data integrity reports include a listing of the second subset of the electronic data, the second subset of electronic data including the data linked with the one or more metadata tags indicative of low data quality.

In another aspect, the one or more data integrity reports include both a listing of: (i) the subset of the electronic data and (ii) the second subset of the electronic data.

In another aspect, the interface layer is further configured to conditionally format one or more display icons representative of the second subset of the electronic data.

In another aspect, the interface layer is further configured to display electronic information stored in the one or more metadata tags.

In another aspect, the interface layer is further configured to provide decision support based at least on the electronic information stored in the one or more metadata tags.

In another aspect, the interface layer is further configured to display select supporting documentation in association with the electronic information stored in the one or more metadata tags, the supporting documentation selected from a data storage and including at least one of (i) when a next update from the corresponding data stream is expected; (ii) when a next update from the corresponding data source is expected, (iii) information identifying the corresponding data stream, (iv) information identifying the corresponding data source, (v) contact information related to the corresponding data source; (vi) a timestamp corresponding to the last successfully loaded datum; (vii) values associated with criticality of the data corresponding to the one or more the metadata tags.

In another aspect, the data acquisition and importation unit is further configured to, for each data integrity notification of the one or more data integrity notifications, transmit the data integrity notification to a corresponding data source and request re-transmission of the corresponding datum linked with the one or more metadata tags indicative of low data quality.

In another aspect, there is provided a system for loading, extracting, and transforming data, the system comprising: a staging layer including: a data repository configured to maintain and store a set of metadata tags relating to a set of electronic data, the set of metadata tags including one or more metadata tags that are linked together to form a matrix structure that enables the generation of data integrity reports and to enable automated decision making based on tracked data integrity; a data acquisition and importation unit configured to obtain, from a plurality of data streams associated with a plurality of data sources, the set of electronic data wherein two or more of the data streams arrive at different times and have different data quality characteristics; the data acquisition and importation unit further configured to receive a set of data processing rules, the set of data processing rules establishing one or more data validation conditions, each of the data validation conditions corresponding to at least one of the data streams or data sources; a data integrity verification processor configured to, in real or near-real time, apply the set of data processing rules to the set of electronic data, by processing each datum of the set of electronic data to determine whether the one or more data validation conditions for the corresponding data stream is met; the data integrity verification processor further configured to, upon a determination that one or more datum of the set of electronic data fails to meet at least one of the one or more data validation conditions, generate the one or more metadata tags indicative of low data quality linked to the one or more datum of the set of electronic data that fails to meet at least one of the one or more data validation conditions, and to store the one or more metadata tags on the data repository; a batch processing control unit configured to generate and transmit one or more control commands based at least on the matrix structure formed of the set of metadata tags; and a data warehouse configured for, in accordance with the one or more control commands obtained batch processing control unit from the staging layer, loading a subset of the electronic data into a data warehouse, the subset of electronic data including only the data that is not linked with the one or more metadata tags indicative of low data quality, and for each datum of the set of electronic data that is linked with the one or more metadata tags indicative of low data quality, and loading a corresponding datum obtained from a data storage maintaining prior sets of electronic data successfully loaded to the data warehouse, the corresponding datum indicative of a last successfully loaded datum from a corresponding data stream of a data source from which the datum was obtained from.

In another aspect, there is provided a method for processing high volumes of data and generating insights within a pre-determined timeframe, the method being performed on a processor coupled to non-transitory computer readable memories and data storage, the method comprising: maintaining and storing a set of metadata tags relating to a set of electronic data, the set of metadata tags including one or more metadata tags that are linked together to form a matrix structure that enables the generation of data integrity reports and to enable automated decision making based on tracked data integrity; obtaining, from a plurality of data streams associated with a plurality of data sources, the set of electronic data wherein two or more of the data streams arrive at different times and have different data quality characteristics; receiving a set of data processing rules, the set of data processing rules establishing one or more data validation conditions, each of the data validation conditions corresponding to at least one of the data streams or data sources; applying the set of data processing rules to the set of electronic data, by processing each datum of the set of electronic data to determine whether the one or more data validation conditions for the corresponding data stream is met; upon a determination that one or more datum of the set of electronic data fails to meet at least one of the one or more data validation conditions, generating the one or more metadata tags indicative of low data quality linked to the one or more datum of the set of electronic data that fails to meet at least one of the one or more data validation conditions, and to store the one or more metadata tags on the data repository; and generating and transmitting one or more control commands based at least on the matrix structure formed of the set of metadata tags.

Many further features and combinations thereof concerning embodiments described herein will appear to those skilled in the art following a reading of the instant disclosure.

DESCRIPTION OF THE FIGURES

FIGS. 12-53 are screenshots of interfaces and reports provided by the system, according to some embodiments.

DETAILED DESCRIPTION

In some embodiments, a system may be provided as a tool for data management, in support of monitoring and analyzing risk. Data management may include, for example, the receiving of data from a plurality of sources and the management of the data to improve data quality (e.g., data cleanliness), the identification of variances between received data and expected data, and the aggregation, transformation and/or presentation of data for various uses. Corresponding computer platforms, methods, computer products and/or non-transitory computer readable media may be provided.

Figure 1:
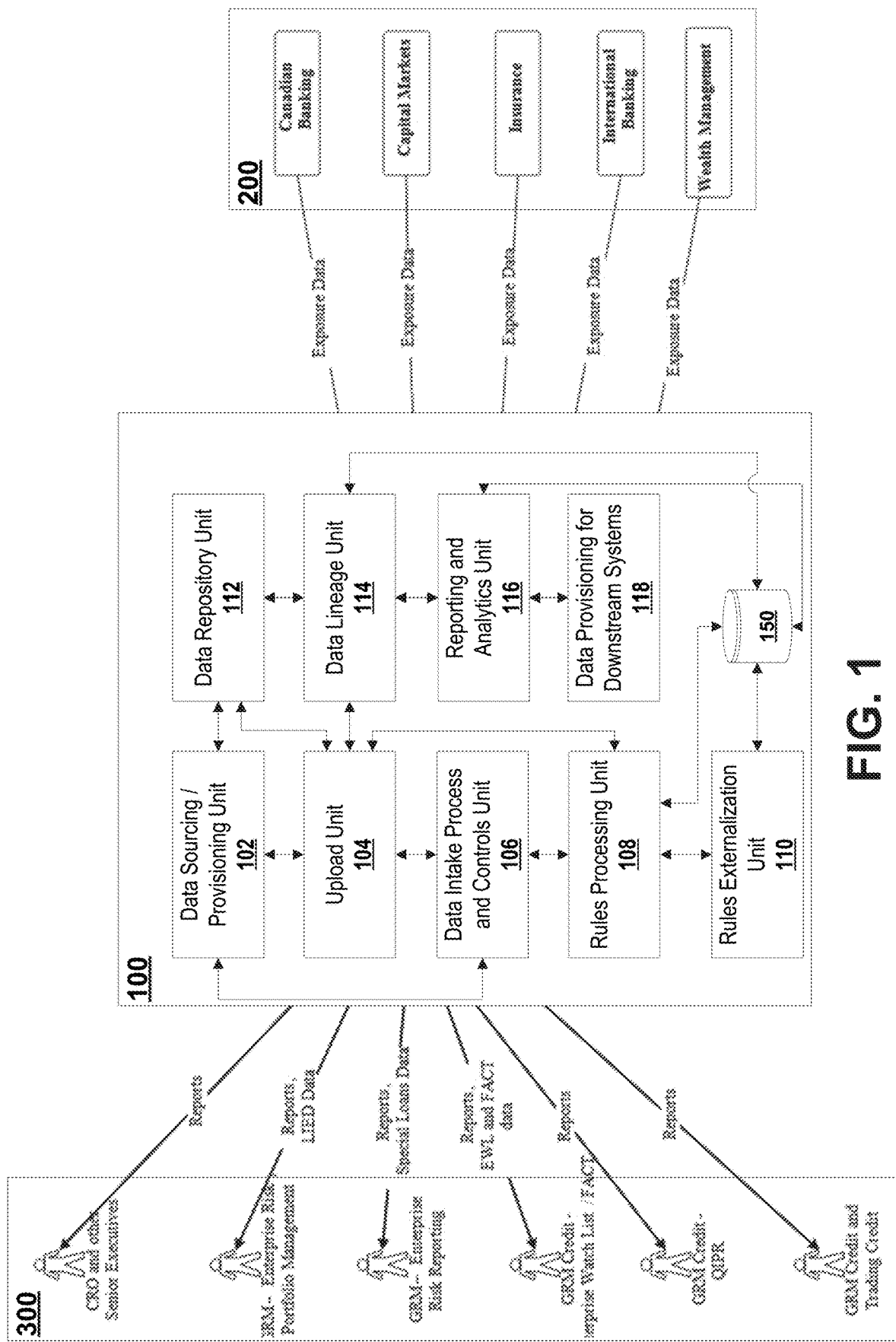
FIG. 1 is an example block schematic illustrating a system for data management, according to some embodiments.

FIG. 1 is a sample block schematic illustrating a system 100 for data management, according to some embodiments.

The system 100 may be used in the context of an enterprise data warehouse, where large volumes of data are received and require processing for the generation of reports. Generating reports and running queries requires the processing of a large volume of data, the processing of which is a non-trivial, computationally difficult and resource intensive task. The bulk of data processing ideally occurs during off-hours, and information is received from a series of disparate data sources over a period of time.

The various data sources may provide data in the form of various data streams, for example, data streams having electronic information encoded in the form of data messages based on various protocols. These data streams arrive at different times from different systems, and may be encoded differently than one another (e.g., different protocols, different types of data).

The ability to perform data processing overnight is an important consideration as there are benefits to having the initial reports readily available in a morning of a workday (e.g., at 8:00 AM). For example, a business decision may be able to be made based on results derived from overnight processing regarding, if the data processing was inadequate, whether the data processing in its entirety or in part should be run again. The earlier that the processing of data can be complete, the earlier that data integrity and completeness issues can be rectified.

Challenges arise when the received data may have data quality, integrity, completeness, or accuracy issues. In some scenarios, it may be possible to utilize stored older data in place of a more up to date data stream, if the older data is not too outdated. While there may be some risk involved in using the older data instead of data having various issues, the decision to use the older data may permit the data processing to be completed within a reasonable timeframe and to have reports preferably available at a reasonable time (e.g., in the morning). There may be the potential for a re-run of selected reporting and/or data processing if required ("intra-day rerun").

Another challenge arises in relation to the ability to determine, when reviewing reports and/or their underlying data, the reliability of the reporting based on the integrity of the underlying data. Reports may be generated based on a multitude of data points obtained from different data sources and different data streams, each of which may have a different associated data quality. The reports and analytics, for example, may be used as part of an overall decision support system 100 such as determining when corrective actions are required to remedy data quality issues. The system 100 for example, may be configured not only to identify data having data integrity issues, but in some embodiments, also automatically initiate re-requests for transmission of data, display additional supporting documentation/information to aid in the actioning upon the data integrity issues, and/or loads the last best data (e.g., the last successfully loaded data having passed various validation requirements).

Business users may also benefit from being able to modify and/or generate data processing rules without writing database commands, such as SQL queries.

An enterprise data warehouse is provided in some embodiments that includes technical features that provide a technical solution to help address some or all of the problems described. The data verification system 100 can be provided in the form of a staging layer (e.g., a pre-load layer) that provides a gatekeeper mechanism for the data warehouse, helping avoid loading the data warehouse with data of questionable integrity by conducting an automated initial validation step. The data verification system 100 may need to be fully automated in some embodiments as it can be designed to autonomously run over a period of time where there is less or no support (e.g., while users are sleeping).

The enterprise data warehouse is adapted for processing high volumes of data and generating insights such that reporting can be completed in a timely fashion in view of limited computing resources, and various insights may be generated that may aid in the monitoring of data integrity.

The pre-loading stage provides a staging environment where source documents may be loaded on to a staging area in which data may be normalized and cleaned up. Batch scripts are utilized to pre-process the data to perform validation of the data. Validation of the data includes determining whether the data arriving is acceptable, and examples of validation include, but are not limited to, comparing arriving data against previously provided data, technical specifications describing how data should be provided, data manifests. In some embodiments, provided data may be cross-checked against other data where the data has interrelated dependencies, etc.

As the data may arrive in various formats, data streams, and data sources, the data may be associated with a set of metadata tags, each of the metadata tags used to capture information about or relating to the data. The data may be tagged and/or linked to metadata tags when the data provided fails to meet one or more data validation conditions.

These data validation conditions may include, for example, (i) a threshold to be met to establish data completeness, (ii) a set of required data objects, (iii) a matching hash checksum, (iv) a set of required data elements, (v) a set of required header information, (vi) a set of required data formatting requirements, and (vii) a specified time in which the datum should have received by the data acquisition and importation unit, among others.

In some embodiments, the data validation conditions include thresholds in addition to or rather than requirements. For example, a data validation condition may be that 5/10 form fields are present (as opposed to having 10/10), etc. Similarly, there may be a sufficiency condition rather than an absolute condition, etc., and some of the conditions may be relative conditions and/or dependent on one another.

In some embodiments, there may be service level agreements established with various data sources that may set out thresholds associated to the data provided. The system 100 may be configured to monitor these service levels to identify any breaches and to take corrective actions. The service levels, for example, may cover specific parameters for the data sources or data feeds, including time, structure, data references, taxonomies etc. To the extent that data sources or data feeds do not meet service levels, this may result in errors in monitoring or analysis of risk conditions. The data validation conditions, in some embodiments, may be obtained directly in the form of data processing rules from the various data sources 200 based on agreed-upon service levels, or extracted from service levels agreements.

The system 100 may be configured to structure data such that data can be dynamically parsed in different groupings, which may potentially allow reliable analysis at different levels of abstraction.

Varied data sets (from different data sources) may be organized and stored automatically in an organized fashion. Linkages may be maintained by the system 100 between received data through to reported data elements, regardless of transformation and/or manipulation of data.

These validation conditions are used through application and/or processing with each datum of the set of electronic data. In some embodiments, each data point is iterated through and validated as it is received by the system 100.

A potential advantage of providing the pre-load/staging environment at system 100 is that various quality metrics can be determined prior to the computationally intensive process of loading and/or processing the data, and if the quality of the data is low (e.g., below a particular quality score or failing various validation conditions as determined based on the pre-processing), the data may simply be bypassed in favor of continuing the report generation without the data set or, in some cases, 'bypassing' the data set by using a previous data set that is stored on or otherwise accessible by the system 100. Batch processing instruction sets may be initiated by the system 100 for example, through the generation and transmission of encoded control commands that may be derived based on the metadata tags.

Whether received data is loaded, ignored, or bypassed may be determined through the application of various rules during the pre-processing step.

In some embodiments, the system 100 is adapted to provide a metadata repository where operational information that is derived in the form of metadata tags during the pre-processing stage can be maintained. The metadata tags may be associated with each datum of the electronic data and maintained in various sub-repositories in the metadata repository, which are connected to each other to form a structured database, such as a matrix structure.

This structured database may be operatively coupled to an analytics platform, which may periodically or continuously monitor the pre-processing, and may be configured to provide various reports that relate to the data quality and/or integrity of the pre-processed data, tracking a 'data lineage' of data points relating to original source data streams and data sources so that an overall data integrity of a particular report may be determined by traversing the set of stored metadata. Where a matrix structure is provided, the matrix may be processed and/or traversed such that there is a greater ease of extraction and/or aggregation of information and/or decision support from the metadata tags. The matrix structure may, for example, store the metadata tags in a linked list wherein the linkages define interrelationships between the metadata tags. Such established linkages may be especially helpful where the metadata tags are provided in association with data points of information where there are myriad linkages (e.g., various N:N, 1:N, N:1) between data points, and pattern recognition techniques are applied to the metadata tags for further analysis.

In some embodiments, the one or more control commands are generated through traversal and/or processing of a matrix structure, as the linkages in the matrix structure may provide greater efficiency and consistency between clusters and/or groupings of commands.

The system 100 may also be adapted for maintaining various data inventories and/or manifests, the data inventories and/or manifests informative or indicative of specific data validation conditions that are known and need to be met. For example, such validation conditions may include at least one of (i) a threshold to be met to establish data completeness, (ii) a set of required data objects, (iii) a matching hash checksum, (iv) a set of required data elements, (v) a set of required header information, (vi) a set of required data formatting requirements, and (vii) a specified time in which the datum should have received by the data acquisition and importation unit.

As depicted, the system 100 in some embodiments, is used to process large amount of data from different sources, such as financial-related information in the context of data infrastructures supporting backend financial institution systems.

The reports generated from the processing, for example, may include tracking financial institution exposure, capital reserve requirements, etc., and the data may be related to client accounts, financial transactions, and/or lending information, etc. For example, a report may be used to review and/or adjust risk exposure of a firm on a daily basis, and the report may be run to provide different views of data, including grouping data points by attributes (e.g., client ID, business code, country, type of exposure).

The system 100 may be configured for various capabilities, such as determining one or more "single names". A "single name" may be related to one or more entities which are related through common ownership, control or management. "Single names" may be used to aggregate related exposure, and/or to provide a conservative view of exposure to connected parties. For example, the "single name" may be used by a business unit to readily identify and report on large credit exposures.

Data may include, for example, historical and/or current data, as well as generated relationships and/or predictive information. Data may have varying levels of quality, such as different levels of reliability, completeness, accuracy, etc. The timeliness of data may be important, as more timely data may be more informative of the current state.

Accordingly, the varying levels of quality of data may be an issue as a user may have varying levels of confidence in respect of the data, and this may impact the ability of a user to rely on the data, for example, in conducting downstream analysis and/or making decisions based on the data, including for the purposes of monitoring or analyzing risk conditions. There may be a need for a data management system 100 that may be configured for improved validation and/or data quality management, which may help with proactively identifying and/or remedying data deficiencies (e.g., untimely data, incomplete data).

Accordingly, at the reporting level a user may be able to, for example, by operation of the system 100 filter results based on data quality attributes at the data record level to understand the number of duplicates, timeliness etc., and more broadly, identify differences in data quality over time, etc. A user may then be able to, for example, take corrective action and review service level agreements with a data source (e.g., a data vendor).

The system 100 may provide for various validation processes, which may include the generation, adaptation and/or application of various business rules that may be used, for example, in improving data quality and/or the processing/pre-processing of data. The data may be extracted from various data sources, transformed and/or loaded in various forms to support various analytical and/or reporting processes. For example, data may need to be verified/cleansed, relationships between elements of data may need to be determined and/or data may need to be aggregated and/or grouped.

Uses for the system 100 may include, for example, data integrity monitoring, risk exposure management, risk exposure reporting, risk exposure analysis, relationship exposure analysis, among others. Determining risk exposure, for example, is a multifaceted exercise requiring the analysis of information received from sources such as government-issued information (e.g., Bank of Canada's interbank lending rate), information from external systems (e.g., credit bureaus, insurance information, trade portfolio information, etc.). Determination of the risk exposure may also benefit from identifying a 'single name' for an entity which may have many related entities and subsidiaries, but for the purposes of identifying risk exposure, operates similar to a single entity.

For example, a financial institution may wish to determine the total risk exposure in relation to a particular trader, a particular portfolio, a client, etc., and this information may be used to inform various decisions that the financial institution may undergo. In some embodiments, the data and/or reports from the data may be used in conjunction with compliance with regulatory compliance, such as audits and/or measuring total risk exposure to various types or classes of assets. A 'single name' may be determined first, based on the particular relationships between entities and organizations. The 'single name' may be used to help determine the total risk exposure.

Alternative implementations where a 'single name' is not utilized may require the use of different names denoting the same entity or a group of related entities presumably based on risk association or dependence. A challenge faced by such an approach is a potential loss of efficiency and greater overhead required when conducting any electronic queries and/or activities. For example, determining a total risk exposure may provide incomplete and/or inconsistent reports, depending on which names are used, and in some cases, there may even be double counting as records associated may be overlapping in nature. Accounting for double counting may result in even more lost efficiency and overhead as specific data processing rules may be required and/or verified, increasing complexity of such a solution.

Some regulatory schemes require the disclosure of risk exposure, as well as policies and/or controls in place to manage risk exposure. For example, financial institutions may be subject to various audits, and the system 100 may aid in determining whether the financial institution is meeting requirements, or if corrective action is required.

Issues currently facing users include data completeness/integrity/quality and the time required for pre-processing prior to use by an analyst. Time may be of the essence in relation to risk as risk information quickly becomes stale, and there are inherent risks in acting on outdated information (e.g., if this takes a week to process, the information may not be very applicable or useful).

In some embodiments, risk exposure may also be related to relationships identified between one or more entities, such as the nature and character of their relationship, whether direct or indirect. For example, relationships could be lending relationships, business relationships (suppliers and/or distributors), partnering relationships, etc., and events at one entity may have various effects on other entities. This allows an institution to be ahead of the curve on regulatory requirements.

Example uses may include the management of risk related to asset portfolios such as the identification of naked/partially covered positions (e.g., uncovered trading positions, weak hedges, insufficient credit default swap coverage), exposures in the event of unexpected market events (e.g., a credit default by IBM or Argentina), compliance with market regulations (e.g., Dodd-Frank/Basel II capital requirements), etc.

The system 100 provides enhanced decision support by being more configurable, by allowing the analyst to "see behind" the high level data quality parameters to then determine whether to reject certain data, give data less weight, seek other data to assess a particular risk condition, wait for an update to the data, contact the data provider etc.

In some embodiments, an analytics and reporting layer is provided in conjunction with a data management system 100 reducing the need for configuration.

In some embodiments, the system 100 may provide for various functionality, such as:
- a staging data mart;
- an integrated risk data mart;
- an enterprise data mart;
- an operational metadata and data quality dashboard;
- intraday rerun functionality;
- high availability (99.99%);
- various business intelligence canned portals (e.g., for running canned reports);
- various business intelligence ad-hoc portals (e.g., for running ad-hoc reports);
- an agile analytical facility (AFF);
- rules externalization;
- a by-pass process (Last Good File Usage);
- leveraged industry standard logical financial modelling (e.g., FSDM—Financial Services Data Model may be used as a reference model to build a logical and physical data model, which may be a relational data model, that may, for example, be implemented on top of one or more semantic models that may be been built for various reporting requirements);
- stress testing (ad-hoc and on-demand risk reporting); and
- big data analytics.

The system 100 for example, may provide a number of benefits in some embodiments, such as:
- reduced manual processes;
- improved decision support capabilities;
- improved data 'freshness' (e.g., from monthly to daily);
- a flexible architecture configured for rapid scaling, adaptability and timeliness of risk & regulatory and portfolio level decisions reporting (e.g., the ability to flexibly add and/or remove a number of data sources and/or reports, canned or ad-hoc);
- the ability to conduct stress testing, limits management, legal entity, regulatory & management reporting for various jurisdictions, such as Canada, USA & the United Kingdom;
- providing a user-friendly reporting interface that may be more readily accessible by a wide range of users to create/run/view various types of reports;
- the ability to conduct 'big data analytics', for example, applying a tiered risk exposure analysis model;
- providing a data-quality monitoring dashboard so that users may more readily monitor data quality and/or timeliness.
- the ability to provide intraday rerun functionality;
- rules externalization-flexibility to change business rules parameters without involvement from technical support;
- 'one-stop shop' availability of client-level information across banking and trading books;
- authoritative source of risk data for downstream enterprise risk users;
- high availability solution-dual loading of data into two production systems;
- increased accuracy and completeness;
- the ability to perform multi-dimensional analyses of data;
- a consolidated platform for the analysis and review of risk exposures; providing a 'one-stop shop' for businesses, geographies, industries and/or products; and
- frequency, timeliness, data quality, reporting and analytics of information (e.g., credit information for wholesale clients).

Users of the system may include financial institutions (e.g., pension funds, banks, credit unions, alternative lending institutions, sovereign wealth funds, institutional investors, high-frequency trading companies), individual investors, academics, high net worth individuals, financial planners, economists, financial analysts, accountants, regulators, etc.

As depicted in FIG. 1, the system 100 may be configured for scaling and/or the processing of a large volume of data. The system 100 may include various units, such as a data sourcing/provisioning unit 102, an upload unit 104, a data intake process and control unit 106, a rules processing unit 108, a rules externalization unit 110, a data repository unit 112, a data lineage unit 114, a reporting/analytics unit 116, and a data provisioning for downstream systems unit 118. The system 100 may also include data storage 150 that may interoperate with the various units to store various elements of information, received, processed and/or otherwise generated by the system 100 including business rules, records, metadata, relationships, primary keys, etc.

The system 100 may be configured to receive data from various data sources 200, and the data may, for example, be provided in the form of data feeds (asynchronous, synchronous, requested data, pushed data, pulled data, polled data, etc.). These feeds may be considered as example data streams. The feeds may have temporal characteristics, and the feeds may, for example, be associated with various timestamps and timing considerations (e.g., processing time, time or receipt), among others.

Data sources 200 may, for example, include sources from financial institutions, capital markets (e.g., market data, venue data, rates, national best offer/bid rates, securities exchanges, clearinghouses, alternative trading systems, dark pools, news feeds, inter-bank offer rates), insurance institutions, international banking institutions (e.g., off-shore banking, multilateral development banks), wealth management entities (e.g., financial planners, wealth managers, hedge funds). The data may be provided in the form of data streams, each of which may include data associated with a particular source during a period of time, etc. For example, a single data source 200, such as a stock exchange system, may periodically or continuously provide data in the form of a data feed, the data being encapsulated, encoded, and/or otherwise formatted in view of various transmission, information, and/or other types protocols.

However, data source 200 may, for example, occasionally provide information that is malformed, incomplete, inaccurate, or improperly formatted. In some embodiments, somewhat 'stale' information as last received from the data source 200 may still be accurate enough for reporting, and the system 100 may be adapted to automatically load this information instead of current data stream information if the data stream is determined to have compromised data quality.

The data sources 200 shown are merely examples. There may be other data sources, such as government statistical information, data feeds from corporations directly or indirectly, news aggregation services, non-traditional and/or proprietary data sources 200, academic institutions, commodity pricing services, external analyst information/ratings, credit rating agencies, etc. In some embodiments, the data sources 200 may also be adapted to provide manifests and/or data inventories that list characteristics of documents, information, and/or data to be provided.

Through data sourcing and provisioning unit 102, the system 100 may be configured to run various reports and/or conduct various analyses for users 300, which may be, for example, a chief regulatory officer (CRO), enterprise risk portfolio managers, credit analysts, trade risk analysts, etc. Other users 300 may be contemplated and in some embodiments, the system 100 is configured to provide reporting information to external systems through the use of various interfaces. In some embodiments, the users 300 may be able to interface with the system 100 to modify the system characteristics, including the generation/modification/adaptation/application of business rules, etc.

In some embodiments, the system 100 may be configured for high availability (e.g., 24/7 operation and 99% high availability). For example, the intake process may include the loaded the data simultaneously in in various systems, and differences in time zones may be taken advantage so that while current data (e.g., denoted as T−1 data) is being processed; end users from different time zones may be able to report on the last best available data set (e.g., denoted as T−2 or older) based on a particular time zone (e.g., Toronto).

In some embodiments, the system 100 may be configured to receive data from 64 information sources (e.g., data sources 200), receiving approximately 300 source feeds, having approximately 32,000 source file elements. Accordingly, there may be a large number of extraction, transformation and loading activities taking place (e.g., over 800), and an aggregate number of records processed reaching 300,000,000 on a particular day.

The data may be received from heterogeneous platforms and the data may be received and/or extracted to be provided in the system 100. The data intake process and control unit 106 may be adapted to perform as a data acquisition and importation unit.

In some embodiments, the which may provide a data structure which, during loading and transformation, the data intake process and control unit 106 may also be configured to standardize and clean data to be formatted into consistent structures, and quality filters and business rules may be applied to provide and maintain improved and/or monitored data integrity and reliability. In some embodiments, the data intake process and control unit 106 may also obtain the various data processing rules establishing one or more data validation conditions, each of the data validation conditions corresponding to at least one of the data streams or data sources.

The rules processing unit 108 may act as a data integrity verification processor, and is configured to apply the set of data processing rules to the set of electronic data. In some embodiments, every datum of the set of electronic data may be iterated through and reviewed based on various data processing rules, such as validation rules.

As the data being provided to the system 100 on a daily basis is generally known and/or setup in advance, processing rules can be configured in relation to expected data sets, data types, quantities of data, formatting, etc. In some embodiments, the processing rules may be based on an automated analysis of prior provided data, for example, processing rules where comparisons are performed using standard deviations in numerical sizes, file sizes, comparisons of information stored in hashes (e.g., to maintain a chain of data integrity between loads), sequential identifiers, etc. For example, if some data was present before but is changed in an unexpected manner, that may also be flagged for a report.

The processing rules may be applicable to different sets, segments, and/or portions of the set of electronic data. For example, some processing rules may be data stream specific, and may provide a threshold overall quality score (even if an element of data is able some processing rules may be data source specific, etc. The processing rules may also blend and combine various data validation conditions, for example, only indicating a failure if multiple conditions are failed, etc. Conversely, the processing rules may provide for blanket failures—for example, data received from an entire data stream may be deemed to fail validation if more than a specific ratio or percentage of the data stream was found to have errors. Similarly, data received from a data source may be deemed to all fail validation if more than a specific ratio or percentage of the data from the data source was found to have errors.

The processing rules may conduct various automated reasonableness assessments. Reasonableness assessments include, for example, reviewing the provided data to determine that, even if they are able to pass a strictly mechanical validation of the data (e.g., they have the correct checksum), they are not in violation of various business rules describing contextual requirements of the data. Such contextual requirements may be determined, for example, based on identified trends of data values, an average (or another statistic metric thereof, such as within 2-3 standard deviations) of prior data, etc. For example, a business rule may include flagging any data as unreliable if the data, while properly formed, has a value for a number that is generally consistent across older data sets and in a current data set, has a significant deviation.

For example, such an assessment may catch a data integrity problem where values have the wrong magnitude (e.g., a house in New York sold for $5.00), among others. The reasonableness checks may also include a holistic determination based on a view of all data validation requirements, for example, an overall quality score may be derived in some embodiments, and the reasonableness assessment to pass all the data validation requirements, it may still nonetheless be flagged and tagged with metadata indicative of lower quality if it is unable to pass the overall quality score threshold.

Various rules may be applied to validate data, for example, or to request updated data and/or flag issues with data. In some embodiments, data may also be flagged and a confidence score/factor appended directly to the data, rather than adding a metadata tag.

At various times, a batch processing control unit may be utilized to generate and transmit control commands based at least on the matrix structure formed of the set of metadata tags, and these control commands are encoded for initiating, provisioning, and/or modifying various actions that may be taken by the data warehouse. For example, the batch processing control unit may, in relation to the data warehouse, generate instruction sets commanding and/or controlling the loading of data into the data warehouse, including which data to load (e.g., most recent or last best available), any associated metadata to be loaded along with the data, etc.

For example, instructions may be provided and/or generated that load, by instructing the upload unit 104, only a subset of the electronic data into a data warehouse, the subset of electronic data including only the data that is not linked with the one or more metadata tags indicative of low data quality. Instructions may also, for example, be provided such that for each datum of the set of electronic data that is linked with the one or more metadata tags indicative of low data quality, load a corresponding datum obtained from a data storage maintaining prior sets of electronic data successfully loaded to the data warehouse, the corresponding datum indicative of a last successfully loaded datum from a corresponding data stream of a data source from which the datum was obtained from.

The upload unit 104 may be configured to upload only data, in some embodiments, or, in other embodiments, the upload unit 104 may also append and/or otherwise transform data uploaded to include any information stored on the one or more associated metadata tags. For example, where a 'bypass' has occurred, upload unit 104 may load into the data warehouse the metadata tag, either separately, or combined with the data.

Such an embodiment provides for the 'bypass' of specific data elements for which low quality scores are associated via linked metadata tags. In some embodiments, such bypass is based on the last successfully loaded data set or data point. While somewhat stale information may be used, such an approach may be appropriate where information rarely changes or changes in small increments. Nonetheless, the metadata tags may be adapted to record various elements of information that may be useful in an automated or a manual analysis of the loading of information into the data warehouse, the metadata tags storing, for example, which of the data validation rules failed, what caused the failure, a priority level of the data, etc.

In some embodiments, the metadata tags may further include risk level information that is automatically generated based on statistical analysis of previous data sets, including, for example, a standard deviation of previous data sets, etc. Old data used for a bypass of an incomplete data set may for example, be flagged as a low risk if the data rarely changes. Conversely, the data may be flagged as a high risk if the data changes frequently (e.g., the old/stale data may be materially different than current data).

The control commands may further initiate actions such as re-requests for transmissions of subsets of data, generation of requests based on the metadata tags that indicates to external systems where data validation checks failed, etc. In some embodiments, the rules processing unit 108 includes one or more rules which automatically request re-transmission and/or updated information based on whether there is sufficient time remaining to re-obtain the information and re-process the information prior to a pre-determined cut-off point. A determination of time sufficiency may, for example, be determined by comparing an average processing time, an average transmission time and requesting, in the request for re-transmission, that information be provided before a particular time so that it can be included in the loading, by upload unit 104, of the data warehouse in preparation for the upcoming work day.

The system 100 may be configured for the implementations of various stages in which data can be accessed and/or reporting may be generated, including a data staging stage, an integrated risk data mart stage (IR-DM), and an enterprise data mart stage. The system may be configured to provide various interfaces at the various stages that provide, for example, visualization dashboards that may be available to users so that users can conduct various tasks, such as monitoring data quality, running reports, creating queries, etc.

For example, the system 100 may be utilized to provide an up-to-date risk exposure analysis/report on a daily basis. Analytics and/or reporting can be provided on different frequencies (e.g., monthly reporting, bi-weekly reporting), or may be conducted on an on demand (e.g., determining the risk exposure at a given time) or ad-hoc basis.

When an issue is identified in a report generated by the loading or a batch process, it may be possible to trigger the batch to run again.

Either the entire batch may be re-run, or only analysis on data from a particular data source (e.g., a subset of the information) may be re-run. If a data source 200 did not provide its data to the system 100 in time for the daily batch, it is possible to initiate the re-run on only that data once it is provided. Or, if duplicate data is detected, the duplication can be addressed at the data source, and the batch rerun. For example, the matrix structure of the metadata tags may be accessed to more efficiently run the re-run by assessing the characteristics in which the data was tagged as incomplete, and in some embodiments, the metadata tags may also contain re-run information that can be used to more expeditiously conduct a re-run, the re-run re-requesting the data and loading the data following a validation check.

The system may be able to determine what parts of the batch to rerun depending on what data was determined to be missing or faulty. For example, there may be dependencies between data or dependencies for particular reports. If there is a dependency between data sources, the system may be aware of such a dependency, and determine that the rerun should include both data sources. Any analytical metric in the batch that is contingent on the data being rerun, may also be rerun.

The rerun would most likely have to wait until the initial batch process completes before it could begin. There may also be a cutoff time each day for requesting a rerun for that day's batch, such as requesting the re-run to close to the next day's batch would delay the next batch. The system may be able to determine an estimated time to complete the requested re-run depending on the size or complexity of the data, and complexity of analysis requested, and adjust the cutoff time accordingly.

The system 100 may be adapted to have various reporting and analytic interfaces and/or units 116, which, based on tracked data integrity and/or quality information, may be used to support various future decision making. For example, reports may be generated, and notifications may be transmitted warning of problems with data integrity, and in some embodiments, such reports and/or notifications may be provided in the form of a streamlined dashboard wherein the data integrity information, such as information obtained in the metadata tags may be utilized to prepare one or more interface elements that are adapted to further highlight and indicate the elements of data which were bypassed, their data integrity issues, how stale the replacement data used was, etc.

In some embodiments, analytic interfaces and/or units 116 may further access various databases and obtain supporting documentation that may aid in the rectifying of various problems determined in the data. Such supporting documentation may be helpful where the supporting document provides useful information, guidance or context. In some embodiments, the supporting information may be static information, such as key contacts, typical remediation steps, an identification of the underlying data source, an identification of the underlying data stream, etc. In some embodiments, the supporting information may be active information that is extracted from the metadata repository.

For example, in some embodiments, analytic interfaces and/or units 116 are adapted to extract, by traversing a matrix structure of metadata tags, helpful relationships and/or patterns indicative of data integrity issues (e.g., the problematic data arrived regarding the same underlying instrument, during the same timeframe, from the same source, from the same data stream, are all malformed in the same way). Accordingly, based on derived information, recommendations may be generated, and the recommendations may also relate more broadly to problematic data sources, streams, similar problems across multiple disparate elements of data, etc.

Specific actionable recommendations may be automatically generated by system 100. These recommendations may be developed through the application of various rules from rules processing unit 108, etc., and may be triggered upon the satisfaction of various conditions. These conditions may be imported, for example, from rules provided by a business team through the rules externalization unit 110.

The rules externalization unit 110 may be configured such that a frontend interface is provided that allows users to create, generate, modify, and/or delete their own rules for what data to include or exclude in the analysis. For example, a user could specify a rule to exclude data from a particular branch of the bank from analysis.

A potential advantage to such an approach, is that testing may not be required to make sure the rule works (e.g., won't crash the system when run), and development time may be reduced. In some embodiments, more complicated rules may still be created and hard-coded into the system, but simple inclusion/exclusion rules may be created through the frontend. Each person who is receiving a report may be able to set his or her own rules from their own workstation. Each batch process may have its own rules or shared rules, and multi-stage and/or compound rules may be set up.

Further, the reporting may permit for various tweaks or modifications to be made to process of data validation, for example, there may be there is greater flexibility in terms of being able to run risk assessments despite various risk factors.

Validation rules and/or thresholds can be modified so that a financial institution, for example, can run risk assessments sooner without waiting for information (where, for example, stale information may be fine for some purposes), more often, and then adjust use of the risk assessment by maintaining the visibility of the underlying data quality parameters.

The system may also be used for running and/or analyzing various financial models, such as determining a possible risk exposure in the event of various financial events (e.g., a client defaults, bond yield rates increase/decrease, a dividend is increased).

The system may, in some embodiments, provide analytical functionalities to business users leveraging "big data" analytical environments in which internal and external data sources may be used, for example, to construct, analyze and/or utilize various analysis models, (e.g., a tiered risk exposure analysis model).

Figure 2:
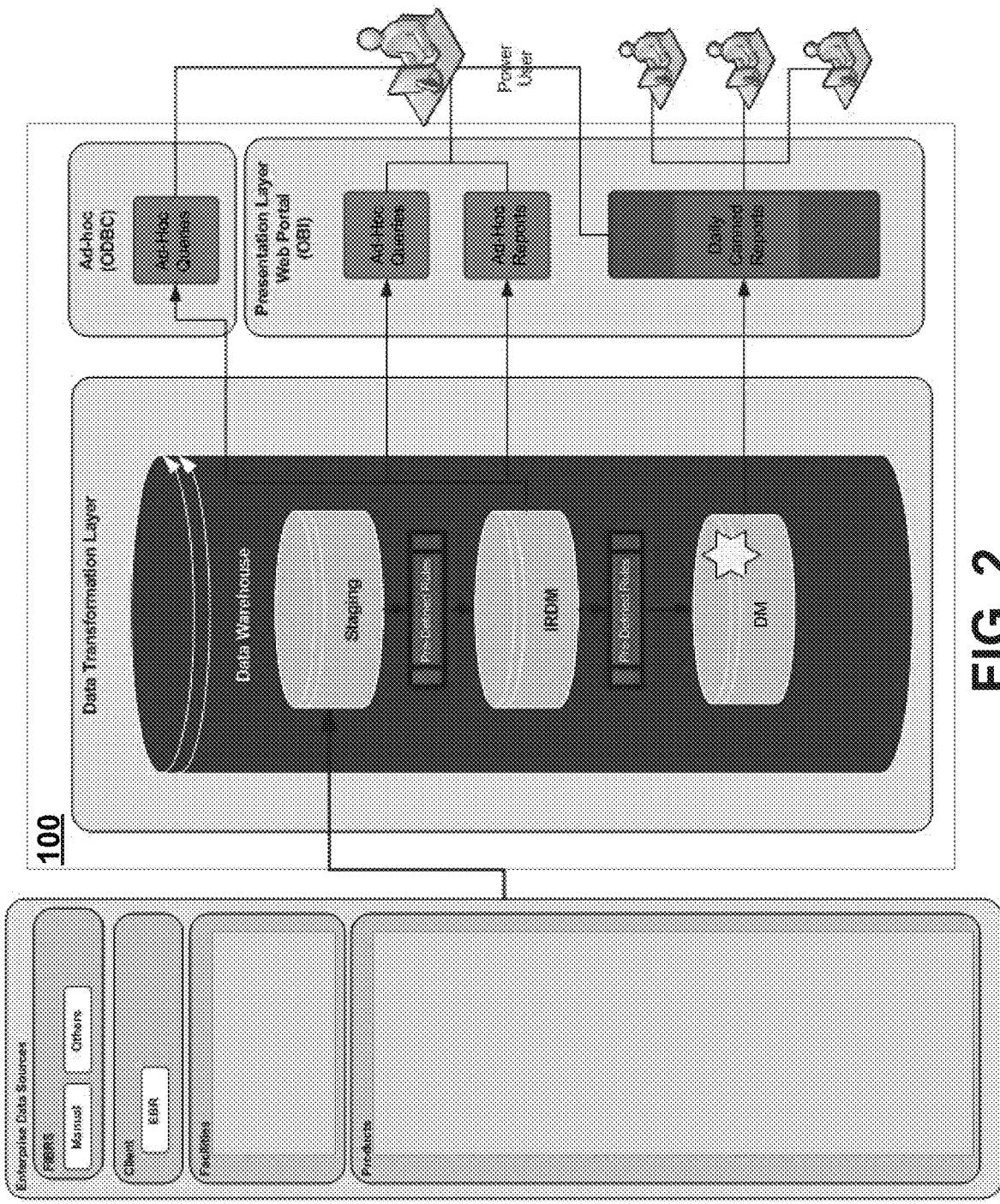
FIG. 2 is another example schematic of the system where the system is illustrated in respect of logical layers, according to some embodiments.

FIG. 2 is an alternate schematic of the system 100 where the system 100 is illustrated in respect of logical layers, according to some embodiments. As illustrated in FIG. 2, there may be various stages included in the 'data transformation layer', including the staging of data, and the provisioning of the integrated risk data mart (IR-DM) and the enterprise data mart.

Figure 3:
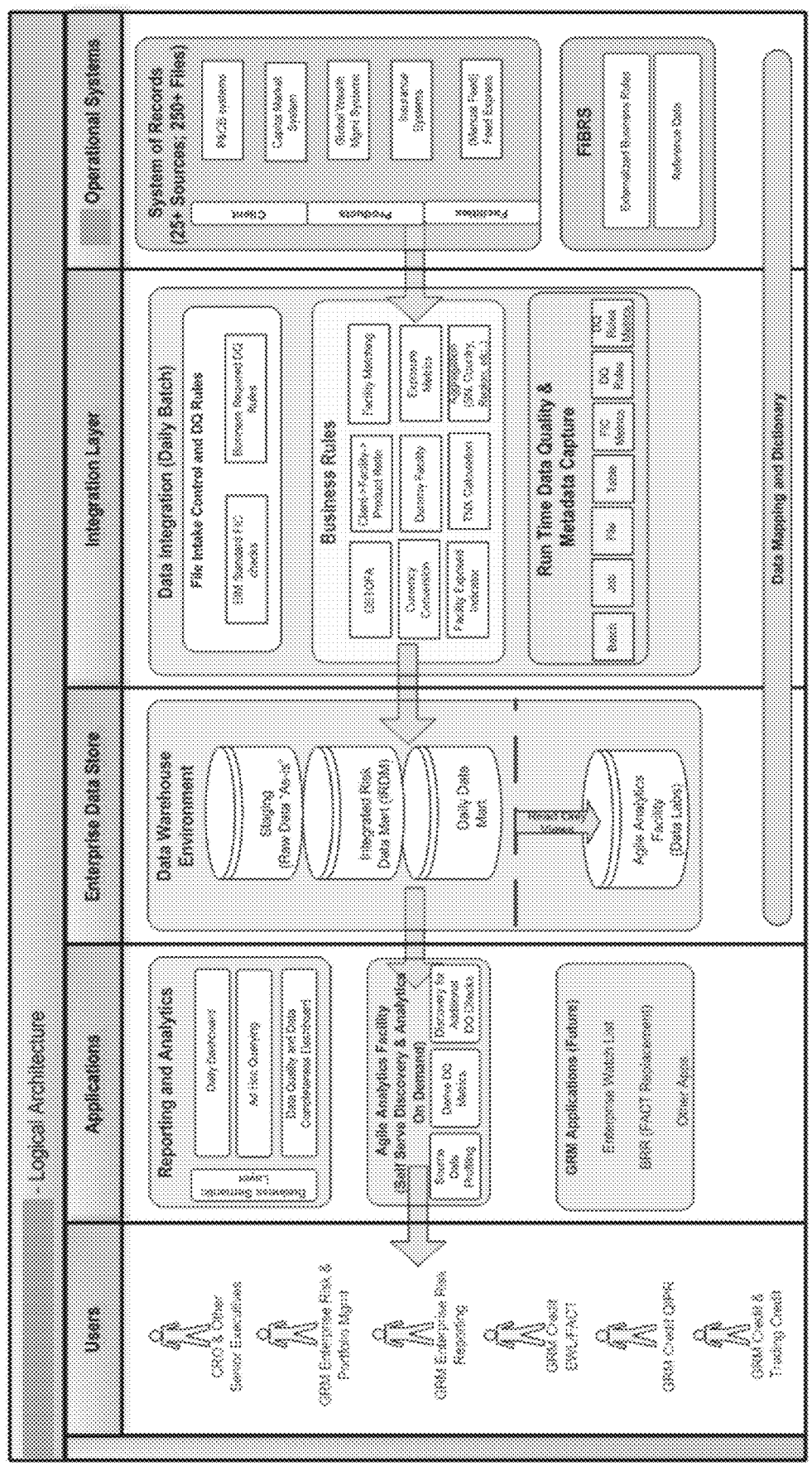
FIG. 3 depicts a logical illustrative of the flow of data from records retrieved from various data sources, to generated reports for consumption by the various users.
Figure 4:
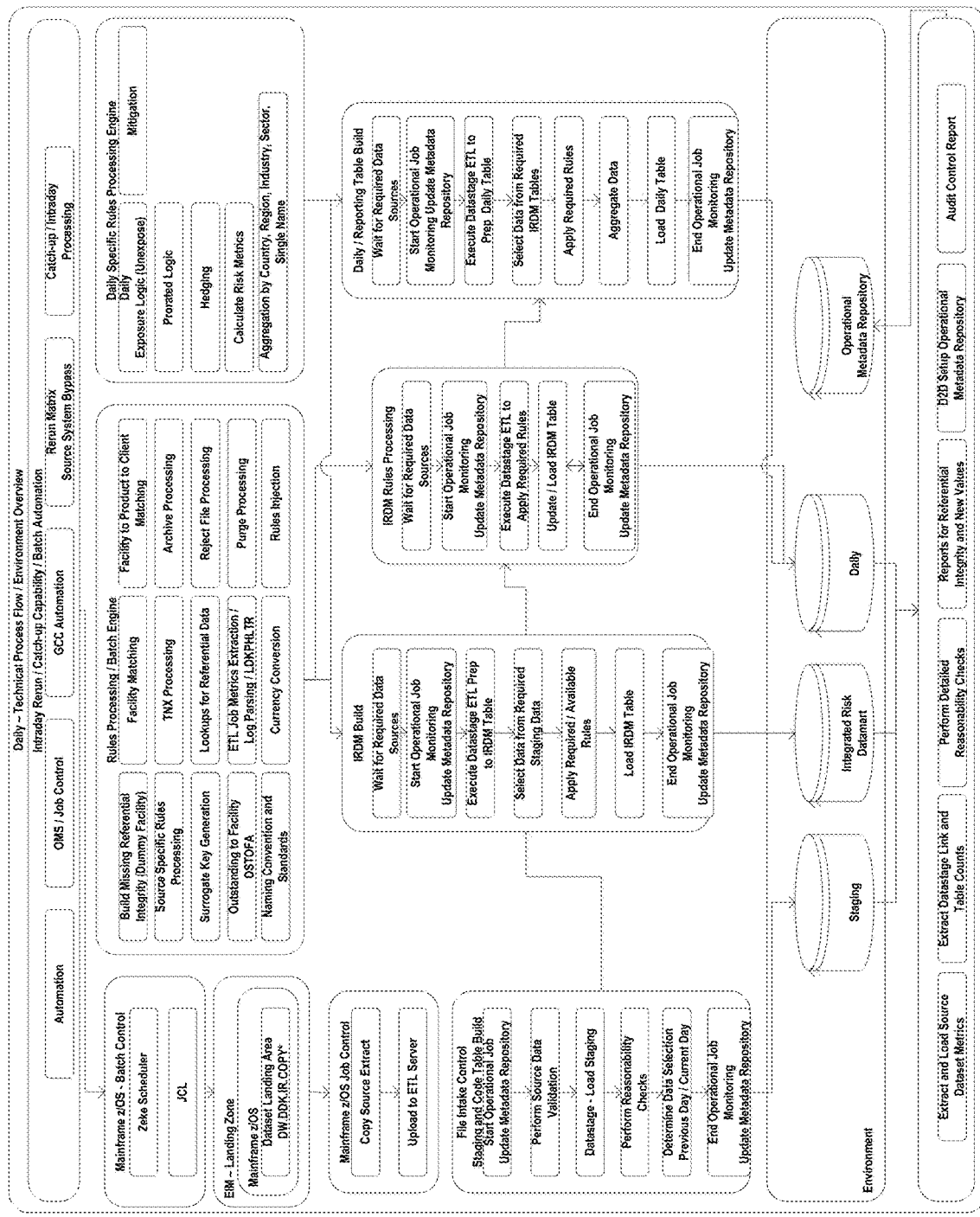
FIG. 4 is a block schematic diagram illustrating a particular implementation of the system, according to some embodiments.

FIG. 3 and FIG. 4 provide logical architectures of the system 100 according to some embodiments. FIG. 3 illustrates the system 100 in respect of the flow of data from records retrieved from various data sources 200, to generated reports for consumption by the various users 300.

FIG. 4 is a schematic diagram illustrating an example implementation of the system 100 according to some embodiments.

The data sourcing/provisioning unit 102, the upload unit 104, and the data intake process and control unit 106 may be configured for receiving and/or the extraction of data from the data sources 200.

The data sourcing/provisioning unit 102 may be configured to interface and/or otherwise receive information provided from data sources 200, including information provided across various communication media (e.g., e-mail, application programmable interface (API), RSS feeds), and across various networks (e.g., point-to-point networks, the Internet, various intranets, etc.). In some embodiments, the data sourcing/provisioning unit 102 may also append various elements of information to the data, such as metadata, unique primary keys, identifiers, timestamps, etc.

Data may be provided in the forms of data feeds, and may be provided over a series of data packets. Data may also be provided in batch format, for example, provided on a particular schedule, etc.

Data may be provided in various forms, such as Financial Information eXchange (FIX) protocol communications, Multipurpose Internet Mail Extensions (MIME) based information, extended markup language (XML), Microsoft Excel™ files, database records, text files, etc.

The data may have an associated data integrity, timeliness, completeness and accuracy, as the data transmitted may not always be accurate, may not always be complete, and/or may contain errors. The data may also be untimely (e.g., transmitted late), etc. The data may also include various metadata elements, which may store ancillary information, etc. The data may also include various data integrity elements, such as parity/check bits, checksums, error correction metadata, etc.

In some embodiments, the system 100 may be configured to maintain data for a predefined period (e.g., 30 days (versions) of source RAW data) in a staging environment. In various situations, such as in case of a delay in receiving files or missing/incomplete files, for a specific date, the system 100 may be configured to load the previously (day/version) available data without waiting for files from a specific source.

An advantage of such a method to "by-pass" is that is that a recipient (e.g., a business unit) is able to obtain reports at an earlier time (e.g., 7 AM) rather than waiting for any delayed/missing source.

For example, such a "by-pass" may be useful in situations where a recipient wishes to obtain reports while simultaneously determining what information is missing and/or incomplete, and then perform actions to rectify the situation. In some embodiments, the system 100 may analyze the records indicative of how many and/or what elements of information are missing and/or incomplete, and generate one or more suggestions regarding the possible impact of the delay/missing state, and an analyst can review underlying documents if applicable to help assess impact, and decide whether to rely on report or wait.

In some embodiments, the system 100 utilizes analytics techniques to suggest possible actions in view of delay/missing element: alternative data to consider, estimated arrival of data, displays contact information of data provider, etc.

The upload unit 104 may be configured for the upload of information, for example, by an operator or administrator of the system 100. A user, may, for example, upload information received from an external source that may be used in conjunction, or as an alternative to data received from various data feeds associated with the data sourcing/provisioning unit 102.

The data intake process and control unit 106 may be configured for the staging of received data, including the loading of the data into the system 100 and its associated data storage 150.

During the course of data intake, there may be various rules applied, for example, rules generated and/or applied by the rules processing unit 108, that may be configured to maintain data integrity, to identify data quality (e.g., completeness, accuracy, timeliness) issues, and/or to maintain relationships and/or add metadata to data received (e.g., data 'lineage' information, timestamps, comparisons with checksums/parity bits).

For example, when data is received, the data intake process and control unit 106 may be configured to receive the data, associate various elements of information (e.g., as metadata), such as timestamp, data source, timeliness relative to contents, and transmit various notifications identifying that updated data has arrived (e.g., automatically disseminates updates to a user interface, or to various individuals who may be related).

The data and the characteristics of its transmission may also be compared against various service levels and/or predetermined thresholds associated with data sources, and various actions may be taken if various business rules are triggered. For example, a notification may be transmitted to a data source indicating that information was not timely and requesting, more timely information to be transmitted immediately.

Various data staging operations may take place, such as the establishment of an intermediate storage area between the sources of information and the data repository, which may be configured for the standardization of data received from data sources 200 and structures. Data may be standardized, for example, where data is received in heterogeneous formats from a plurality of data sources.

In some embodiments, the intermediate storage environment may include the application of various rules by the rules processor unit that may be, for example, adapted and/or modelled for data source and/or data feed.

In some embodiments, the data sourcing/provisioning unit 102 and the upload unit 104 may be configured to receive data with no/minimal transformation logic and rejection. In some embodiments, there may be rejection at this stage for primary key violations and/or file intake control validation issues).

Data quality may be validated through the application of various rules by the rules processor unit. The following are examples of business rules that may be applied:
source data validation as per the mapping;
file intake controls;
header date check; detail row count check; zero byte file check;
the staging retained data of last good files/version; and
the primary landing area.

Accordingly, in some embodiments, business users may have un-interrupted access to reporting features, with the possible exception of scheduled outages.

In some embodiments, the data intake process and control unit 106 may be configured to maintain various metadata repositories, such as an operational metadata repository. The data repository may be configured to store results from operational batch process flows and data quality checks. The data repository may be configured to monitor batch and data quality in real-time, near real-time and/or over a period of time. For example, the following metrics may been captured:

when batch starts and finishes;
the current status of batch, job control language (JCL) and extract, transformation, load (ETL) specific jobs;
the current status of tables;
load counts of tables;
file intake controls results; and
duplicate & reject record counts.

Various checks may be performed to verify that system 100 has received the source data (e.g., an extracted file) as it was intended in a timely manner and/or there are no errors in file transmission to the system 100. The checks may provide various audits, such as record counts received as compared to record counts processed.

In addition to standard checks; there may be additional data quality (DQ) rules applied for execution as part of the batch flow for the extraction, transformation and loading of data, to evaluate the quality of raw data in source system extracted for processing.

These data quality business rules may, for example, be externalized (e.g., in FiBRS (Financial Business Rules system) and be stored as part of the data repository). The externalization may involve the exposure of the business rules as modifiable objects that may be adapted, created, refined, etc., through the actions of a user, or through an application programming interface (API).

In some embodiments, the results of the processing may be being stored in the database 150 and may be made available for viewing through various interfaces, such as a dashboard associated with data quality reports (DQR).

The data repository may be configured to store the results of a batch on a real or near real-time basis.

In some embodiments, the data intake process and control unit 106 may be configured to use batches to generate load files by parsing various logs and place them into the data repository folder in a landing zone. A secondary batch process may also be created using a utility to load the files created in the data repository folder to various intervals.

The rules processing unit 108 may be configured to generate, update, adapt, refine, delete and/or apply various business rules. The rules processing unit 108 may be configured for the application of business rules at various stages of data receipt, transformation, loading, etc. These rules may be provided in the form of logical relationships expressed in the form of software code.

The business rules may append metadata to data, indicate a rejection of data, flag data for having various issues (data quality, etc.), effect various actions based on logical conditions, generate notifications, etc.

In some embodiments, the business rules may be configured for adaptation over time, either automatically or manually. The business rules may be triggered, for example, by an event or the occurrence of various conditions.

In some embodiments, the rules processing unit 108 may be configured to provide intraday re-run and catch up functionality through the application of various business rules. Intraday re-run functionality may be activated, for example, when there is the identification of bad/undesirable data received from data sources 200

The intraday re-run functionality may be used to rerun/reload/reprocess the data (either partially or a complete batch), at various stages of the data flow, such as during the data staging stage, the IR-DM stage, or even the enterprise data mart stage, and may be conducted at the level of a single data source and its dependent processes, or more broadly across various data sources and/or various data feeds.

The intraday re-run process may include the application of one or more business rules that initiates rerun calls. In some embodiments, rerun calls may be conducted on a scheduled basis and/or by an administrator. The rerun calls may be made, for example, on the identification of bad/undesirable data received from source systems or due to failures and/or exceptions raised when the data is used in downstream units (e.g., reporting, data transformation, processing).

The various processes may delete the undesired data and may reload/reprocess the new data. The identification of incorrect data source may be conducted by various entities, for example, by one or more analysts, etc. In some embodiments, the rerun processes may be automatically triggered by downstream exceptions and/or data failures (e.g., a report receives malformed and/or expired data inputs).

In some embodiments, the system 100 may be configured for a daily review and/or data validation of content, reviewing data quality and/or identifying various anomalies.

The following table, Table 1, illustrates some example rerun batch processing scenarios:

In this scenario, batch will be stopped and supported by production support team and rerun from end to end.

In some embodiments, the system 100 may be configured to support an agile analytical facility for analytics and developing/executing additional data quality checks and business rules. The agile analytical facility, may be configured so that it is available to power users having various credentials. In some embodiments, the agile analytical facility simplifies the provisioning, linking and visualization of various analytic workspaces within a data warehouse environment.

Power users may be, for example, business users with privileged access to databases, systems and reports as compared to day to day users.

Figure 9:
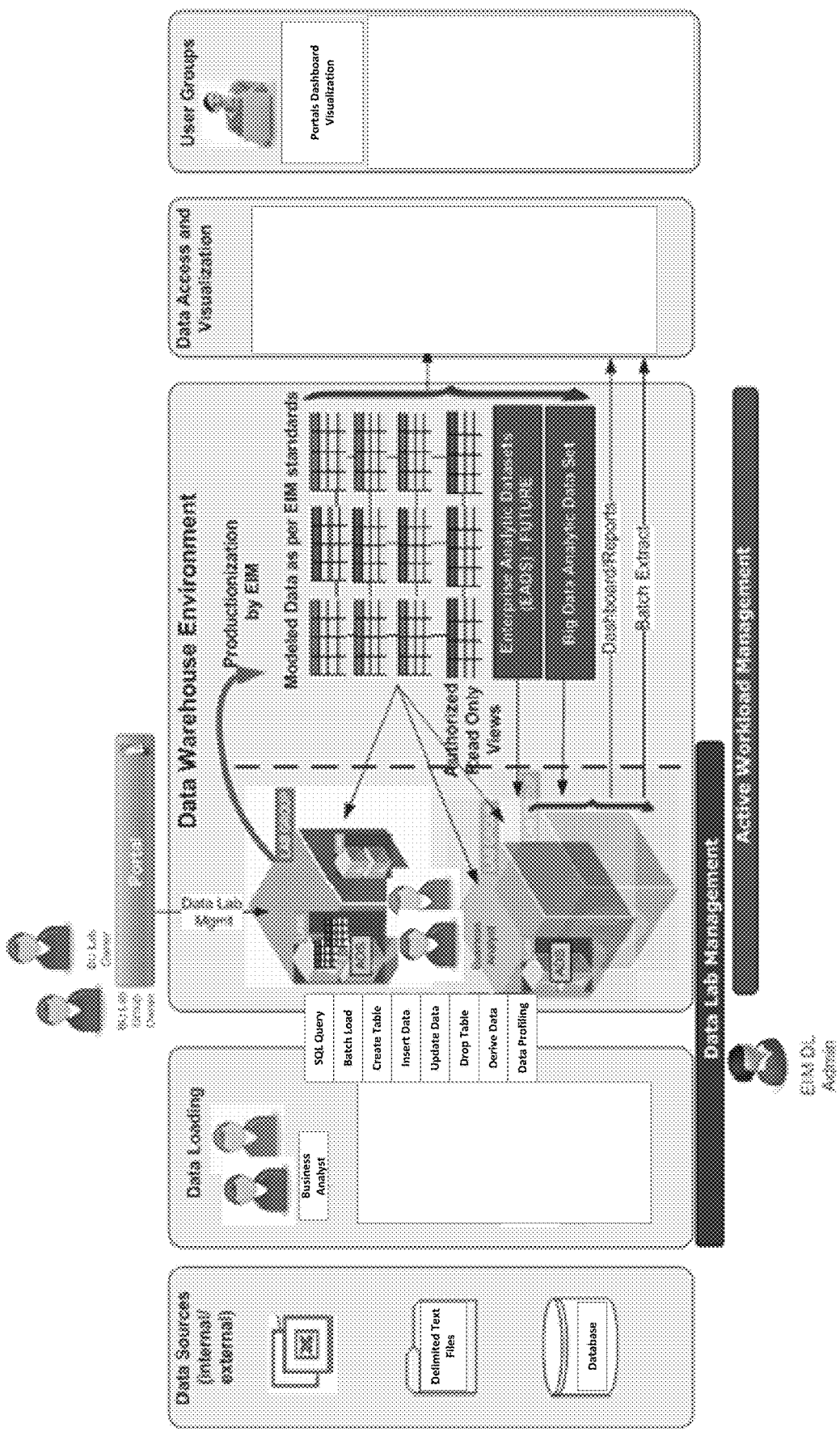
FIG. 9 illustrates a sample architecture for an agile analytical facility, according to some embodiments.

FIG. 9 illustrates a sample architecture for an agile analytical facility, according to some embodiments.

Figure 10:
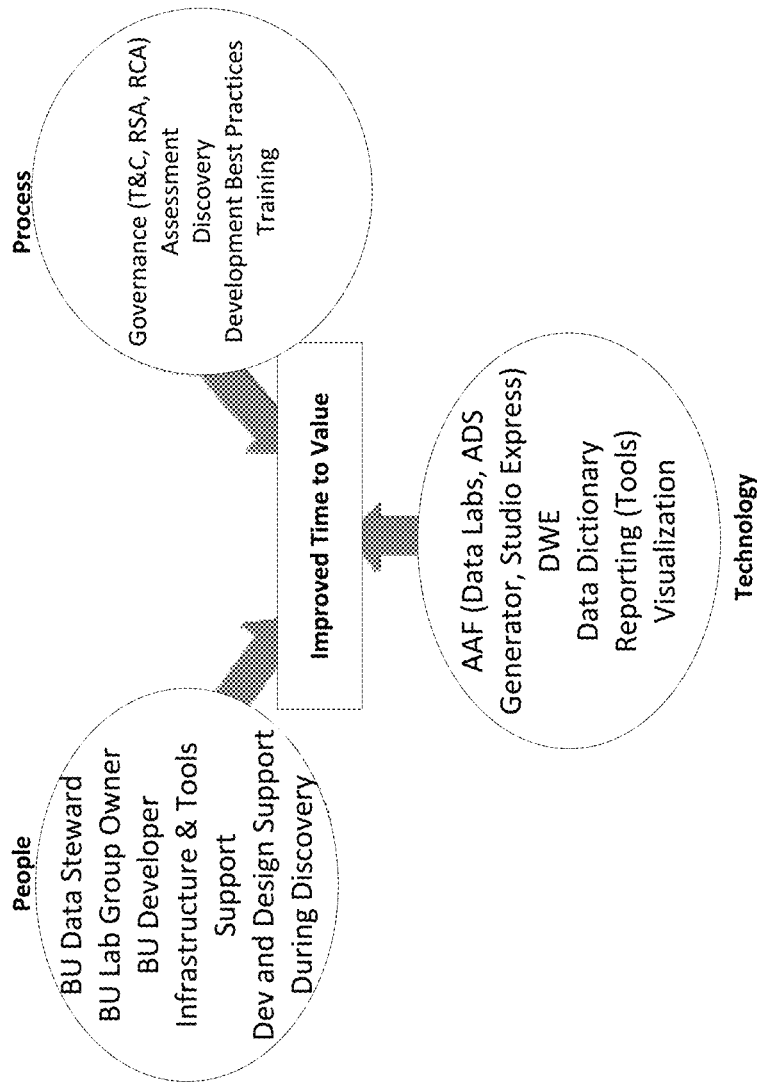
FIG. 10 illustrates sample components for an agile analytical facility, according to some embodiments.

FIG. 10 illustrates sample components for an agile analytical facility, according to some embodiments.

| # | Rerun Scenarios | Resulting Actions |
|---|---|---|
| 1 | During the end of day (EOD) batch process, source file is missing/not received (by final cut off) | Use last good file received |
| 2 | During EOD batch process, source file failed critical "File Intake Control" checks as being defined for the system (e.g. header, trailer, reasonability tests, invalid values, etc.) | Based on the exception handling rules either use previous day good file; or raise an alert and process the current days file. |
| 3 | During EOD batch process, source file was processed successfully but incorrect data was loaded (identified during the day by a business user) During next EOD batch, process T-2 day corrected source file along with processing current T-1 day data from all sources | Business Decision to initiate Rerun Back out data. Rerun the daily reporting process (business rules and aggregations). Developed service level agreement (SLA) based on source file arrival times and processing dependencies. Start previous day catch up very early in the next day batch |
| 4 | Extend Data Warehouse Explorer (DWE) regular EOD Batch window beyond 8:00 AM EST either to accommodate; a) Critical system files arriving late; or b) Previous day catch-up process | a) Developed SLA based on source file arrival times and processing dependencies b) Start previous day catch up very early in the next day batch cycle |
| 5 | During EOD batch process, source file was processed successfully but incorrect data was loaded (identified during the day by a business user). Source file is materially inaccurate and management cannot wait until next day to get aggregate exposure. Business decision is to re-run exposures during business hours for accurate reporting that same day. | Business Validation Process Business decision to initiate intraday rerun Source Files available for intraday rerun Back out incorrect source data Rerun the daily reporting process (business rules and aggregations) Regenerate Reports |

Figure 5:
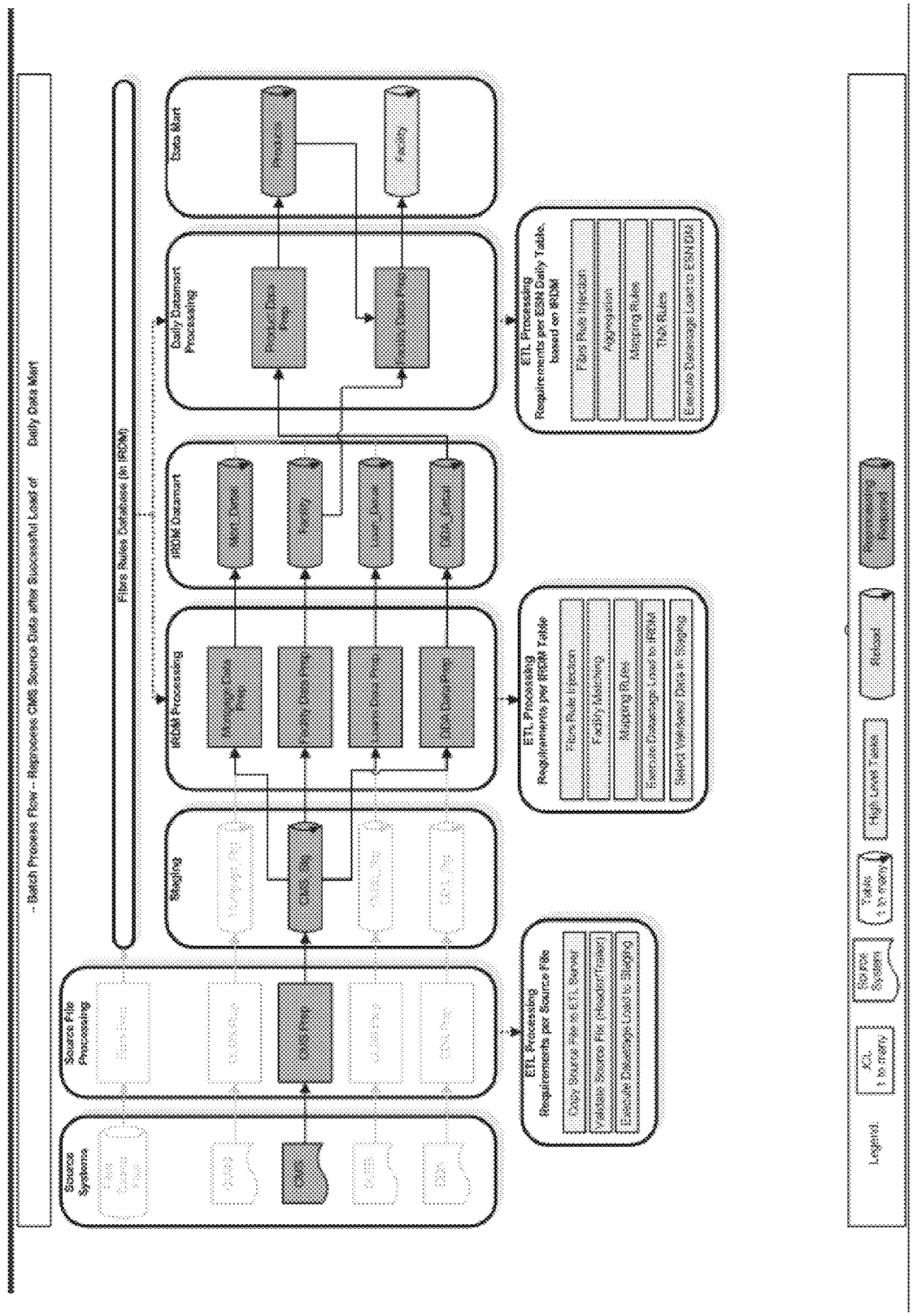
FIG. 5 illustrates a sample scenario where data from the CMS source data is reprocessed after a successful load of the data mart, according to some embodiments.

FIG. 5 illustrates a sample scenario where data from the CMS (credit monitoring system) source data is reprocessed after a successful load of the data mart, according to some embodiments. In this sample scenario, CMS source data is reprocessed after a successful load into the enterprise data mart: to reload facility data, the system 100 is configured to complete the rollback and reprocess the data flow that is highlighted in purple. A rerun, for example, may be required due to data issues.

Figure 6:
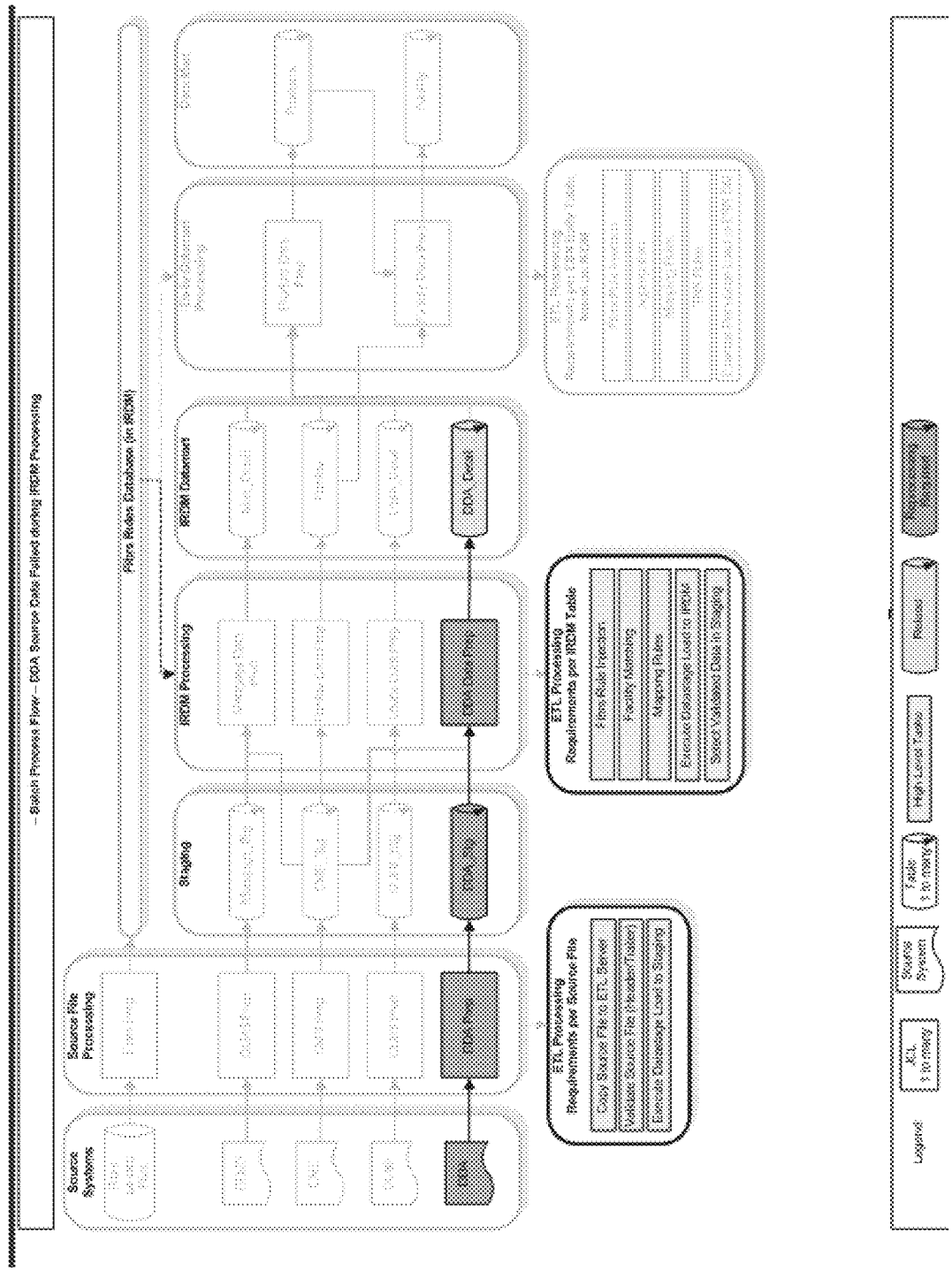
FIG. 6 illustrates a sample scenario where DDA source data is reprocessed due to failure, according to some embodiments.

FIG. 6 illustrates a sample scenario where DDA (demand deposit account system) source data is reprocessed due to failure, according to some embodiments. To reload DDA data, the system 100 is configured to rollback and reprocess the data flow only for the elements related to the DDA (highlighted in purple) as the failure is due to a specific source system 100.

The rules externalization unit 110 may be configured to externalize various business rules. The externalization of business rules may include providing the ability for users and/or administrators to generate, update and/or apply rules, such as creating rules having various conditions and/or thresholds without the need to engage a technical support team, as is typically required using conventional systems. A potential advantage to such an implementation is a reduced dependency of business user on the software development cycle (SDLC), code changes, and QA test cycles to implement changes, which may provide for significant cost savings and increased responsiveness.

In some embodiments, the business rules may be externalized and adapted into the workflows as part of various batch process. For example, rules that may be externalized include: inclusion/exclusion lookups, static lookup (predefined data, defaults) and/or dynamic lookup (data translation).

An example business rule, for example, may include an exclusion business rule having a query such as: "Do not select records where C5ELNREC-TRANSIT-LN=9346, 9391, 9394, 9396 (test transits)".

An example business rule, for example, may include a static lookup having a query such as: "Move 'XB' for X BANK".

An example business rule, for example, may include a dynamic lookup having a query such as: "Convert C5ELNREC-CLOSE-REASON: '0'='CL' '1'='CL' '2'='AT' '3'='ME' '4'='SP' '5'='WO' '6'='CO' '7'='RE' '8'='OC' '9'='RN', 'B'='CB', 'C'='CM', 'D'='CD', 'I'='CI', 'L'='CS', 'M'='BM', 'N'='NB', 'O'='OF', 'S'='BN', 'T'='TD', blank=blank, else move 'OT'".

An example business rule, for example, may include a dynamic lookup having a query such as: "If (DE374 PROD_STATUS='CL' and (If DE083 CLOSE_RSN_CODE < > 'WO' then move C5ELNREC-DATE-LAST-FIN) else If (CLOSE_RSN_CODE='WO' move DE521 WOFF_LAST_DATE)) Else if DE374 PROD_STATUS < > 'CL' move zero.".

An example business rule, for example, may include a load status business rule having a query such as: "Select only records (where C5ELNREC-LN-STAT='03' (Active), '04' (Delinquent), '05' (Non-Accrual) or (where C5ELNREC-LN-STAT='08' (Closed) and C5ELNREC-DTE-ACCT-STAT-EFFECT not=99999)".

An example business rule, for example, may include a dynamic SQL, having a query such as: "SELECT RL_R0015.TARGET_VALUE_ALPHA PROD_STATUS, COALESCE(RL_R0008.TARGET_VALUE_ALPHA, L_R0008D.TARGET_VALUE_ALPHA) CLOSE_RSN_CODE, CASE WHEN PROD_STATUS RL_R0006.SOURCE_VALUE_ALPHA AND CLOSE_R-SN_CODE RL_R0007.SOURCE_VALUE_ALPHA THEN L LIM_WO_RCVRY_DATE_LAST. WHEN PROD_STATUS=RL_R0006.SOURCE_VALUE_ALPHA THEN L.LIM_DATE_LAST_FIN ELSE 0 END CLOSE_DATE FROM DDVVTIRW.OLBB_LN_ACCT L LEFT OUTER JOIN DDVVTIRW.FiBRS_RULES RL_R0008 ON RL_R0008.RULE_CD='R0008' AND LLIM_CLOSE_REASON=RL_R0008.SOURCE_VALUE_ALPHA LEFT OUTER JOIN DDVVTIRW.FiBRS_RULES RL_R0008D ON RL_R0008D.RULE_CD='R0008' AND RL_R0008D.SOURCE_VALUE_ALPHA='<OTHER>' LEFT OUTER JOIN DDVVTIRW.FiBRS_RULES RL_R0015 ON RL_R0015.RULE_CD='R0015' AND LLIM_LN_STATUS=RL_R0015.SOURCE_VALUE_ ALPHA LEFT OUTER JOIN DDVVTIRW.FiBRS_RULES RL_R0007 ON RL_R0007.RULE_CD='R0007' AND CLOSE_RSN_CODE=RL_R0007.SOURCE_VALUE_ALPHA LEFT OUTER JOIN DDWTIRW.FiBRS_RULES RL_R0006 ON RL_R0006.RULE_CD='R0006' AND PROD_STATUS=RL_R0006.SOURCE_VALUE_ALPHA".

In some embodiments, the data repository unit 112 may be configured to provide an integrated risk data mart (IR-DM), which may be a normalized data mart configured to manage data associated with enterprise risk.

The IR-DM may be configured for supporting particular subject areas, such as involved party, arrangement, location, product, etc. The configuration may, for example, determine what set of business rules will be applied based on data in the IR-DM.

The IR-DM may, for example, have stage 1 (Source to IR-DM) business rules applied.

There may be various rule engines and/or processes that may be applied, for example: OSTOFA—Outstanding to Facility, Facility Matching, Dummy Facility, and TNX (Total-Not-to-Exceed). Other rule engines or processes may also be included.

For example, a dummy facility may be associated for all the products which are not associated with a facility. A dummy facility process may be used to uniquely identify a group of products for which a parent facility number does not exist. Dummy facility processes may be used to create and/or identify the relationship between such facilities, and may be applicable for products such as: current account, credit card, letters of credit, lease, loan, mortgage, security, security finance products (TCAL), derivative products (TCAL), collateral products (TCAL), fix income products (TCAL), money market products (TCAL).

In some embodiments, a OSTOFA process may be configured the OSTOFA:—The OSTOFA process is designed to find a match between facility and product, for products such as: loan, mortgage, current account, letter of credit, etc.

In some embodiments, a facility process may be used to find a match between a facility and a product, and the facility process may also be configured to delete wrong product and facility relations. For example, the process may be used with various products, which may include: credit card, current account, letter of credit, mortgage, etc.

In some products, a total not to exceed process and/or rule set may be applied. The following is an example embodiment of the total not to exceed process.

TNX arrangements may be implemented to provide a client greater flexibility to manage borrowed funds. For example, TNXs may be configured to allow multiple borrowers under a "single name" to draw funds against a set of authorized credits shared among them.

Definitions of TNX Arrangements:

| TNX Arrangement | Description |
|---|---|
| Standalone Facility | Standalone TNX Limit calculation |
| Link | Limit on one borrower across two or more distinct facilities |
| Share | Limit across two or more borrowers that share a single facility |
| Cap | Limit across two or more borrowers and two or more facilities. |
| Nested Cap | Limit across TNX arrangements and including perhaps standalone facilities, such that all subordinate TNX arrangements are fully contained within it. |

Definitions of Single Name TNX Structures:

| Single Name TNX Structure | Description | |
|---|---|---|
| SIMPLE | ACCEPTABLE | |
| COMPLEX | Properly Nested TNX | ACCEPTABLE |
|  | Not Properly Nested TNX | NON-ACCEPTABLE |

Figure 11:
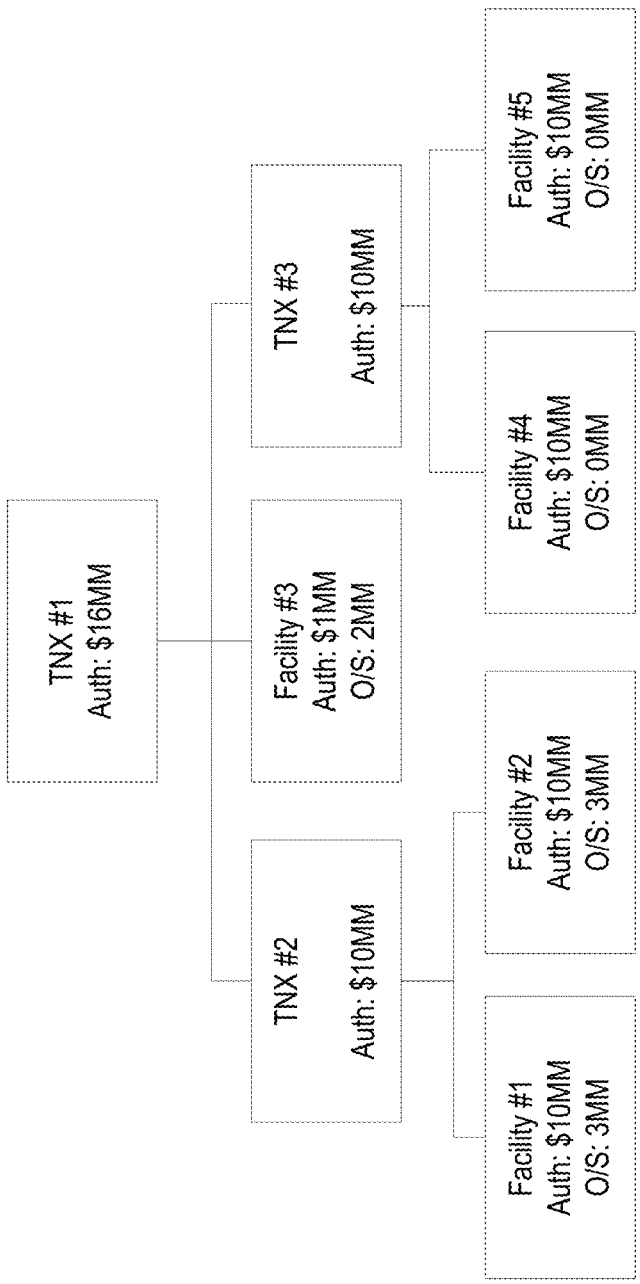
FIG. 11 is an example organization chart indicating credit authorizations of various entities and facilities, according to some embodiments.
Figure 12:
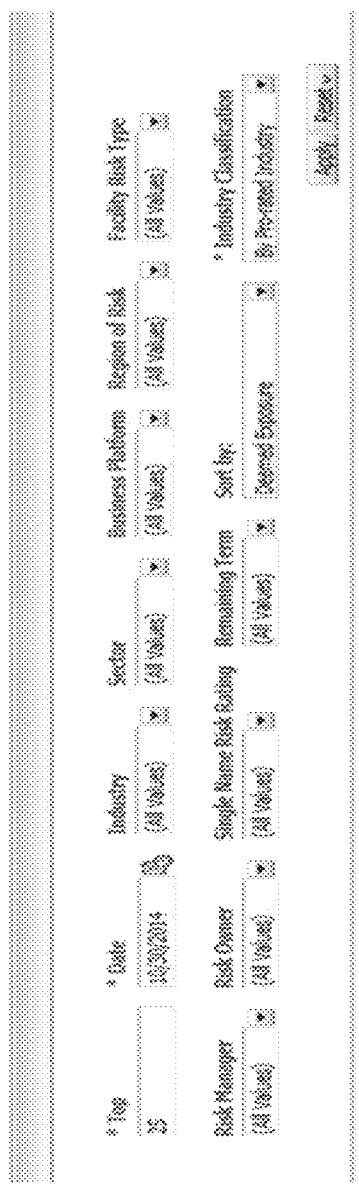
Figure 15:
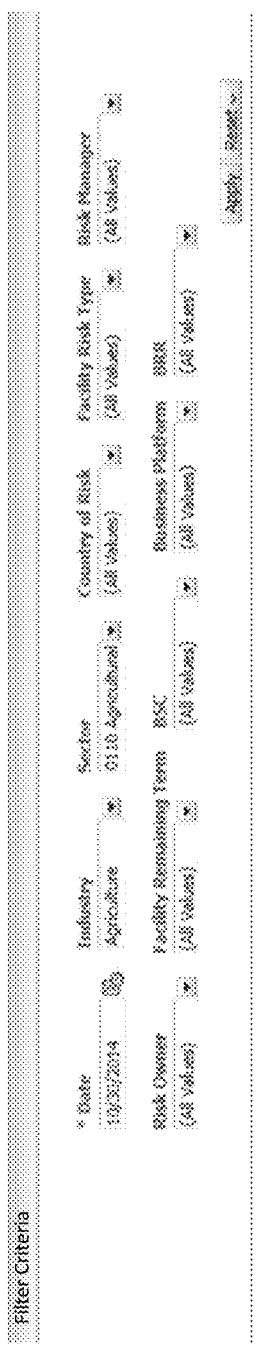
Figure 18:
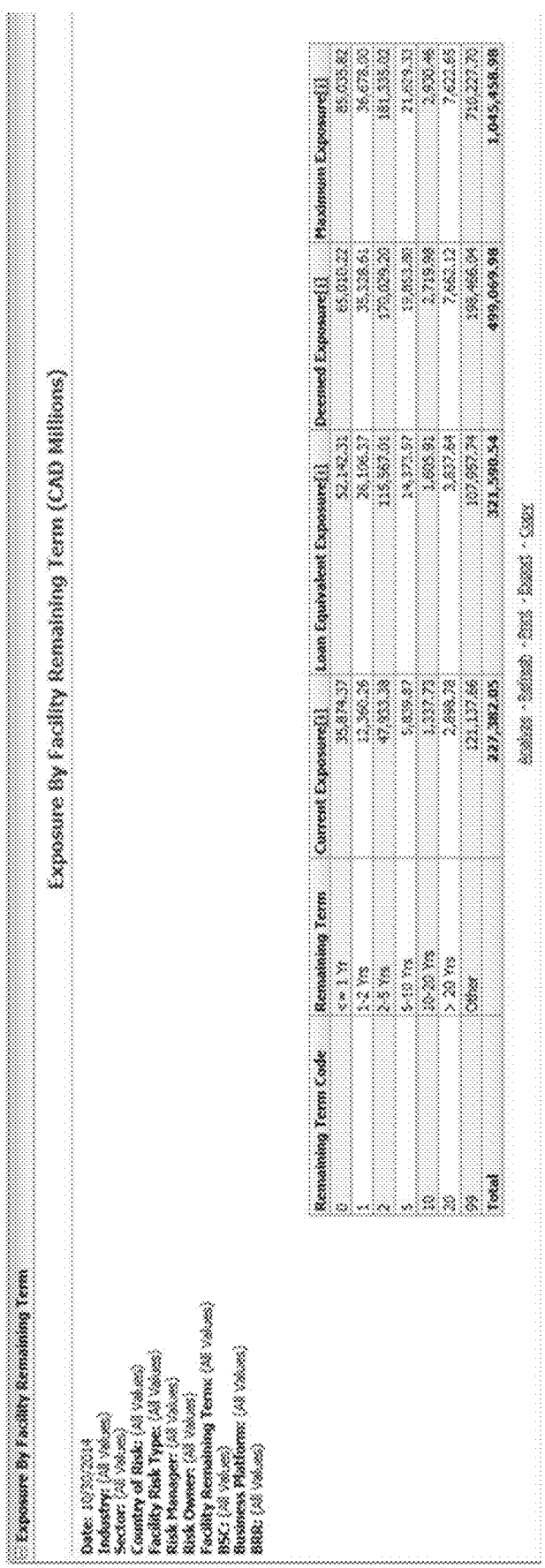
Figure 19:
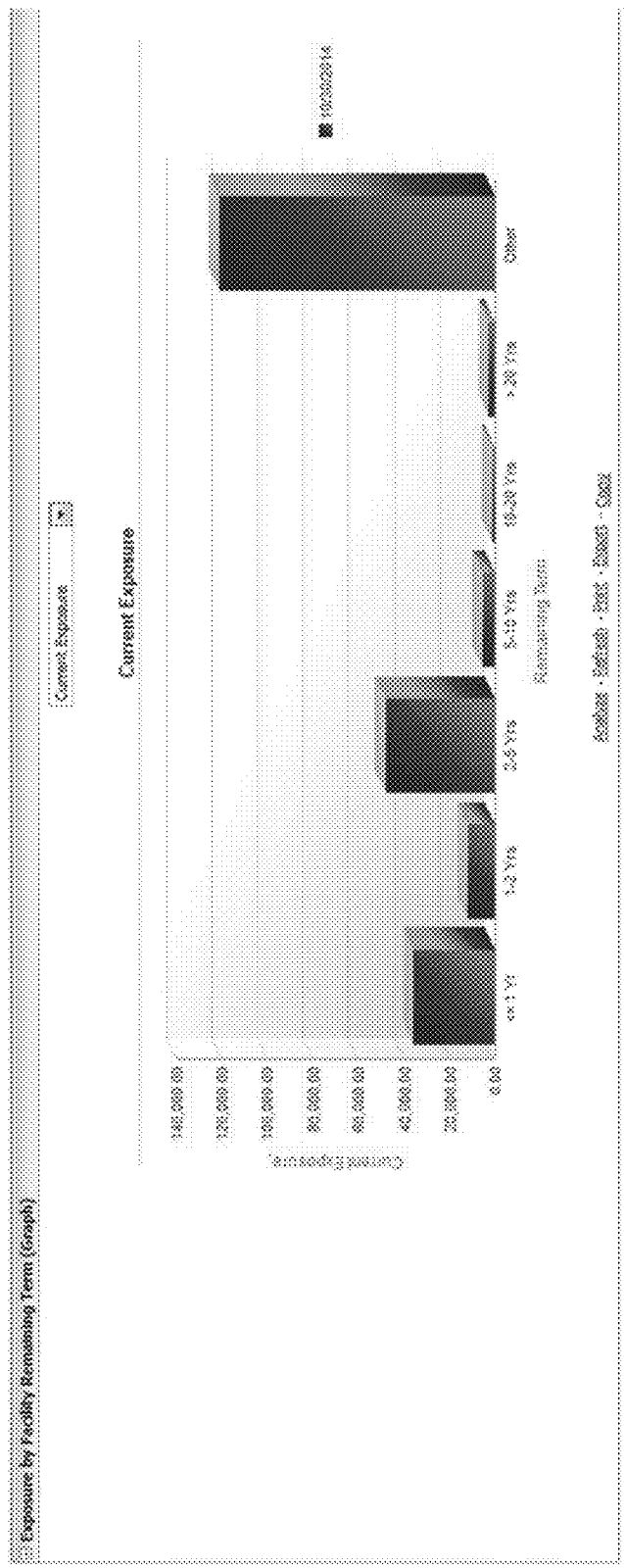
Figure 21:
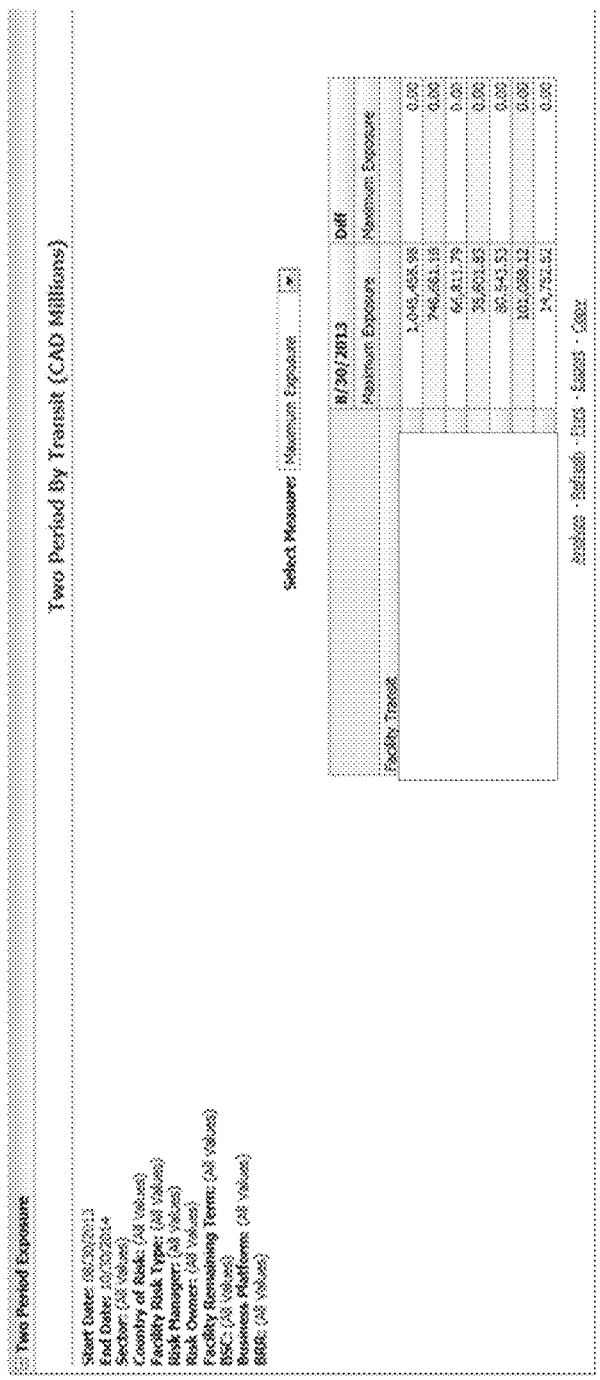
Figure 24:
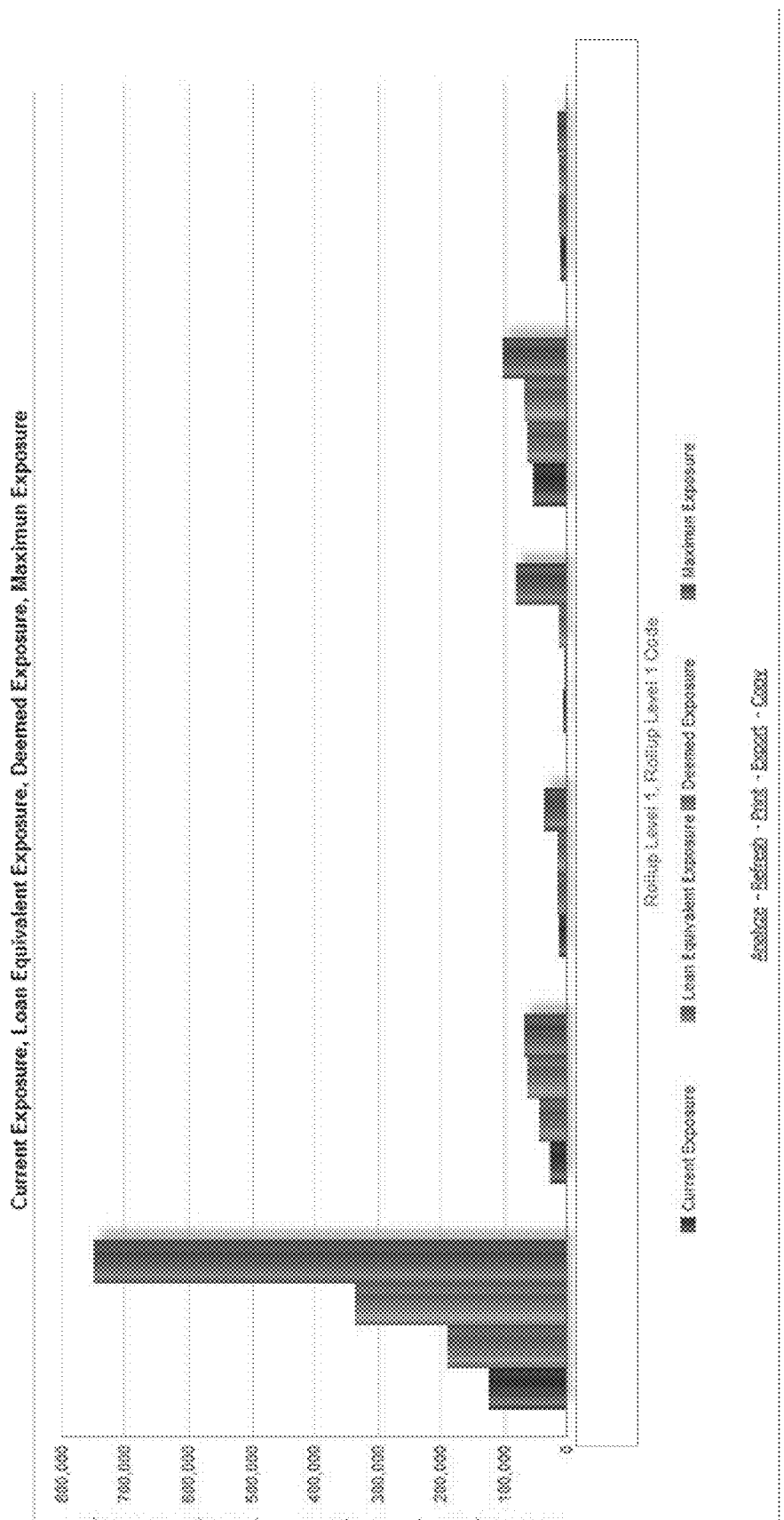
Figure 26:
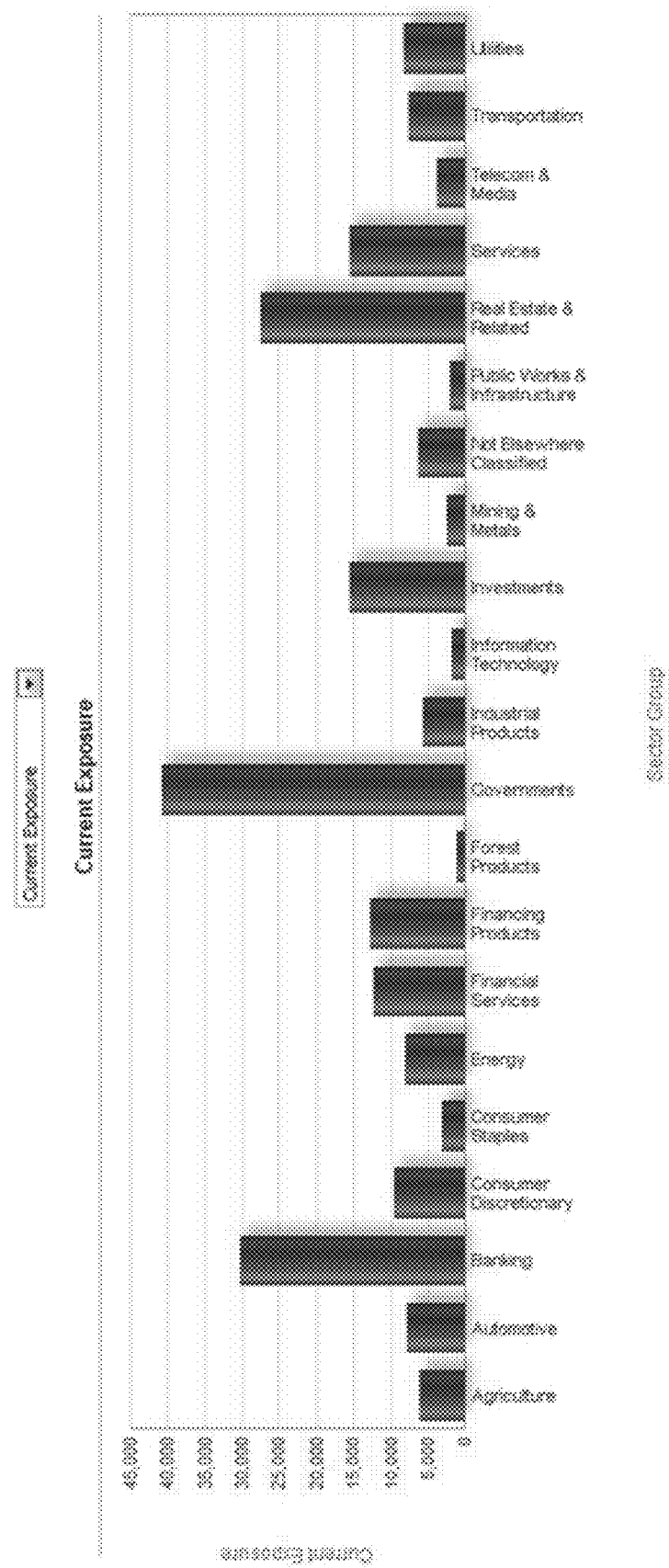
Figure 27:
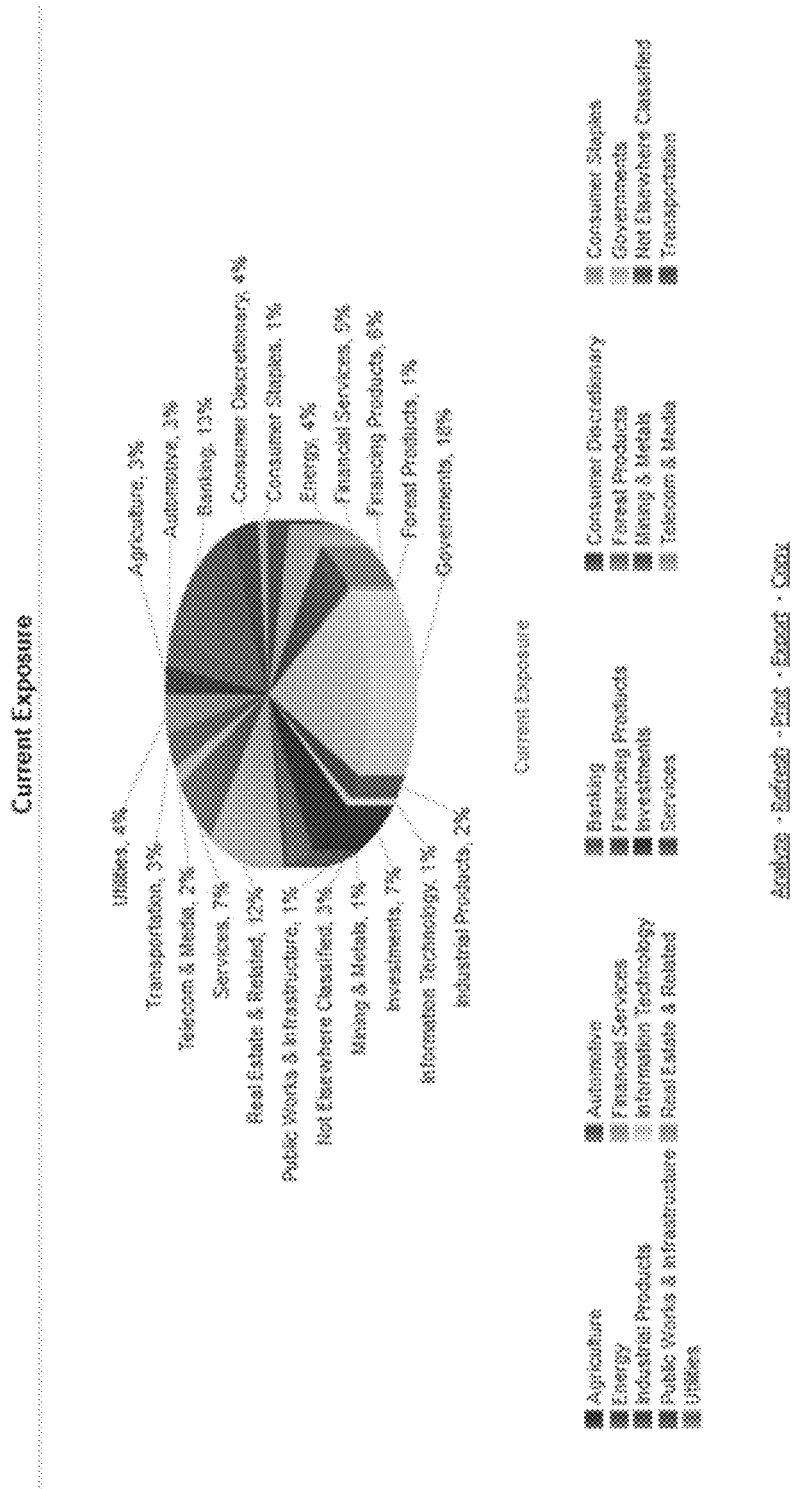
Figure 29:
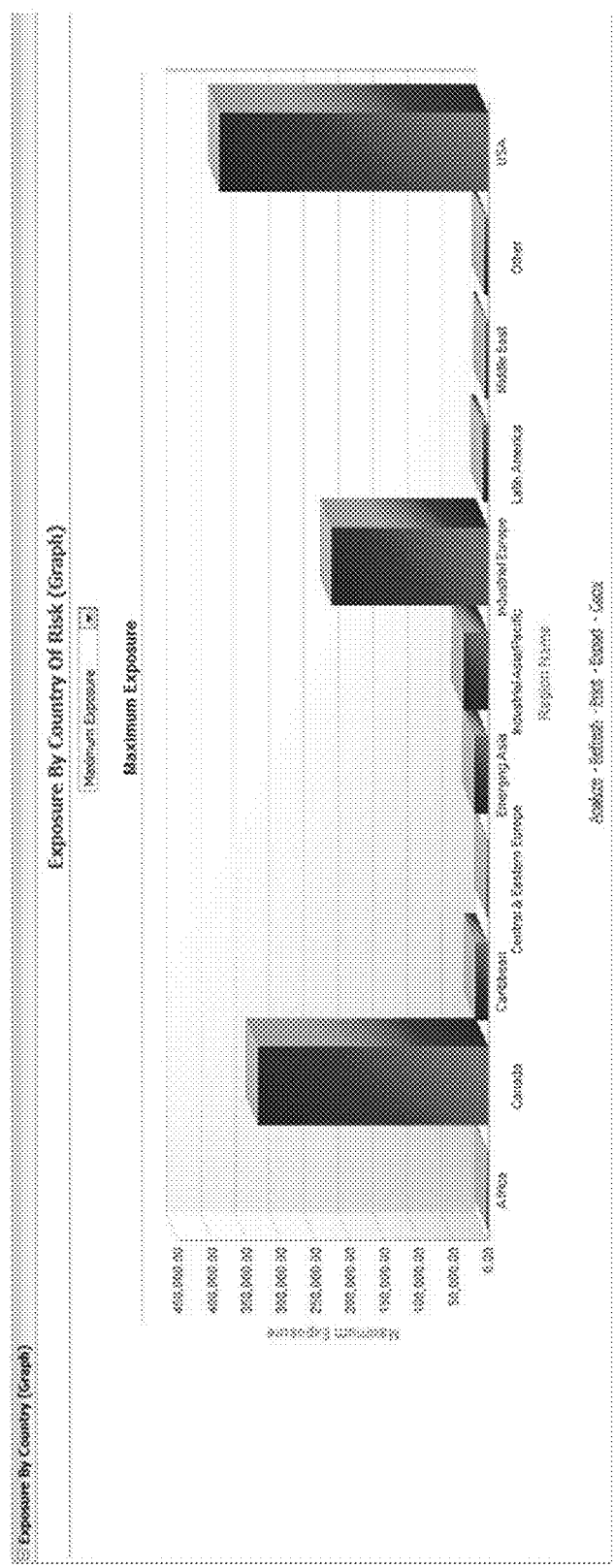
Figure 32:
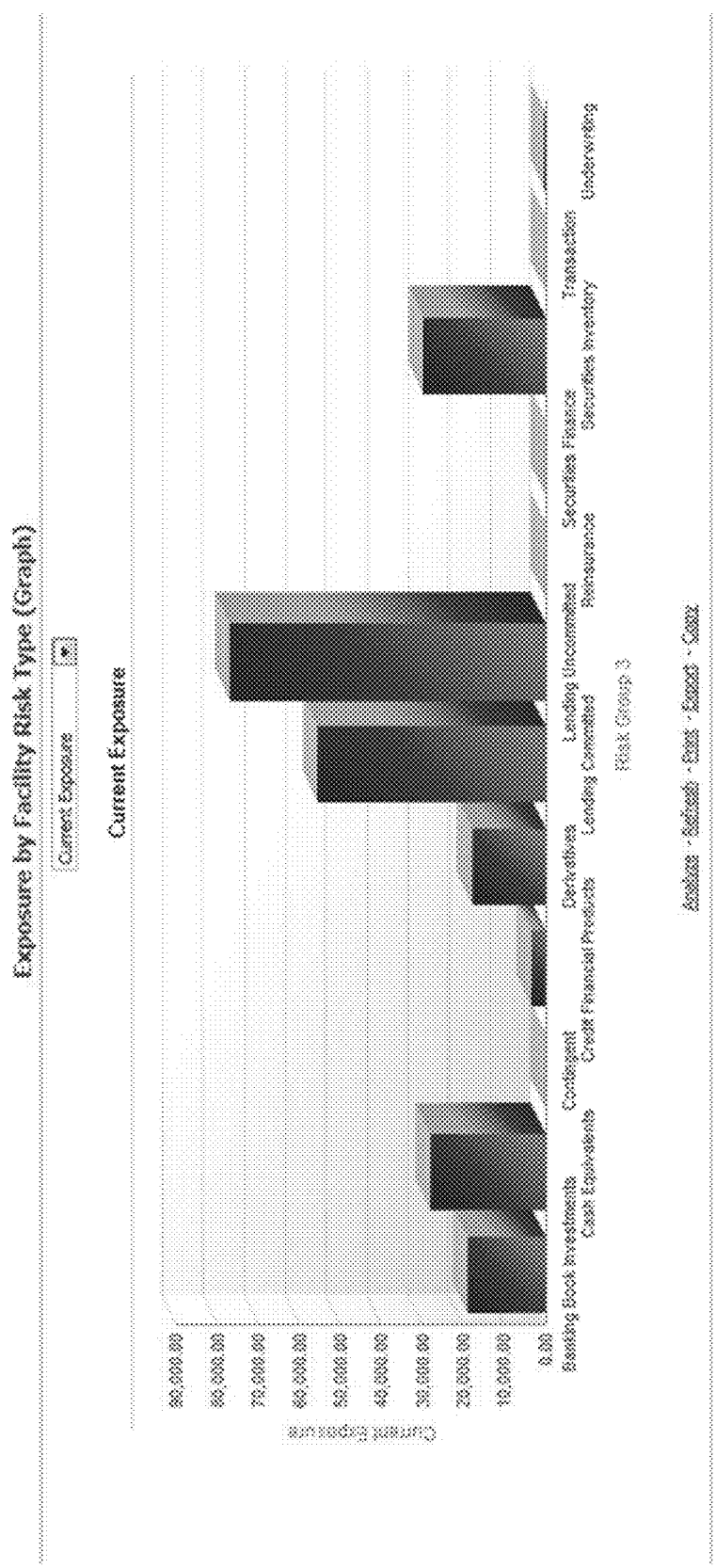
Figure 33:
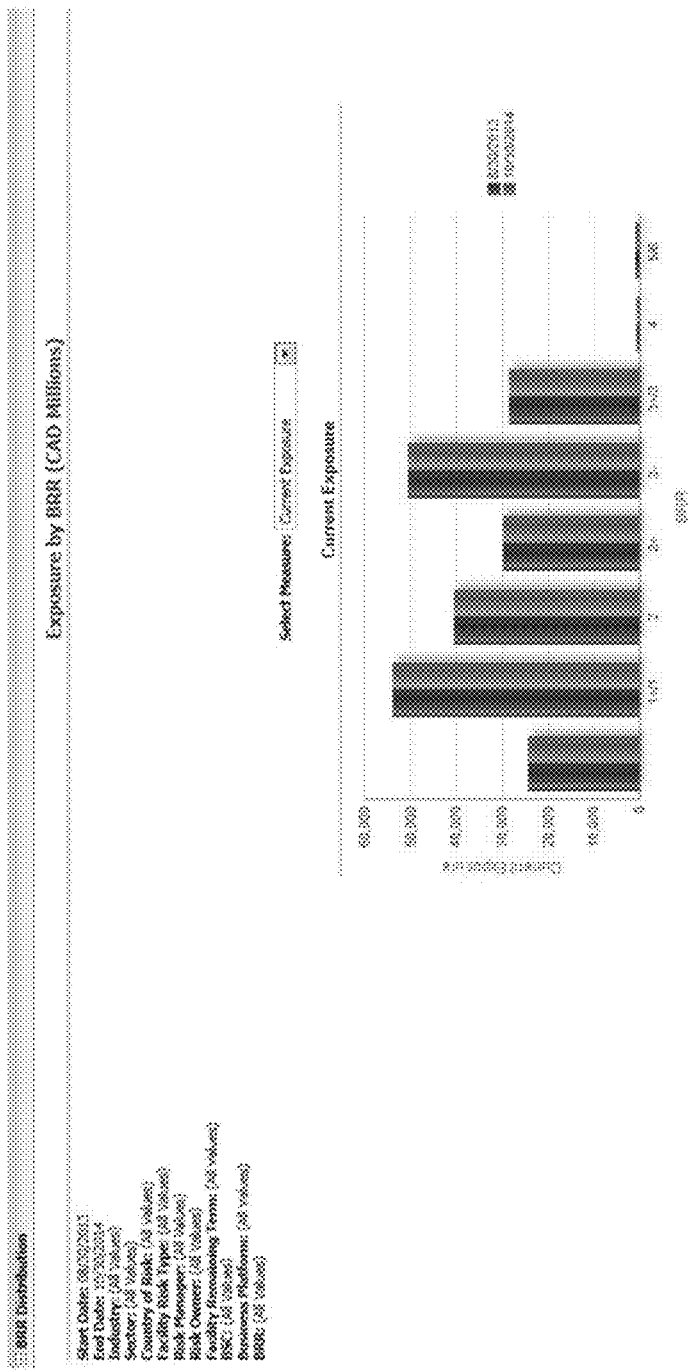
Figure 35:
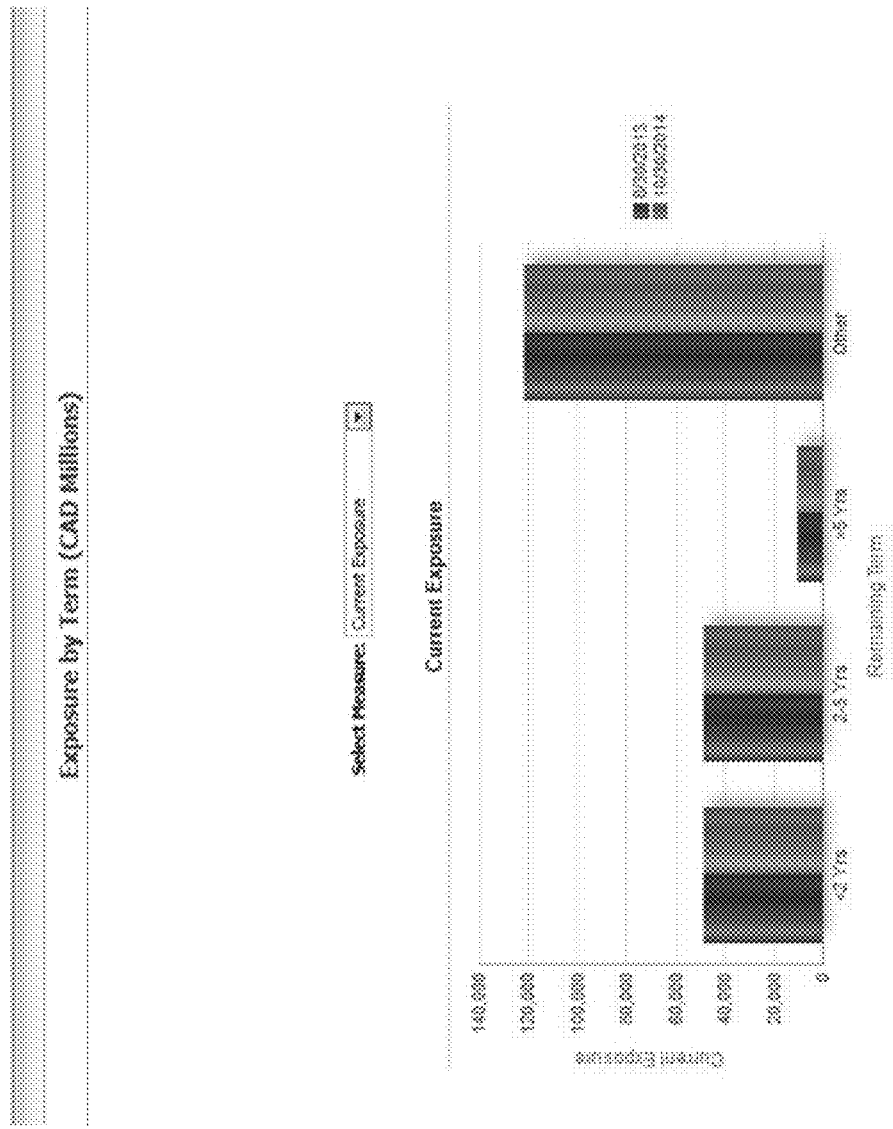
Figure 37:
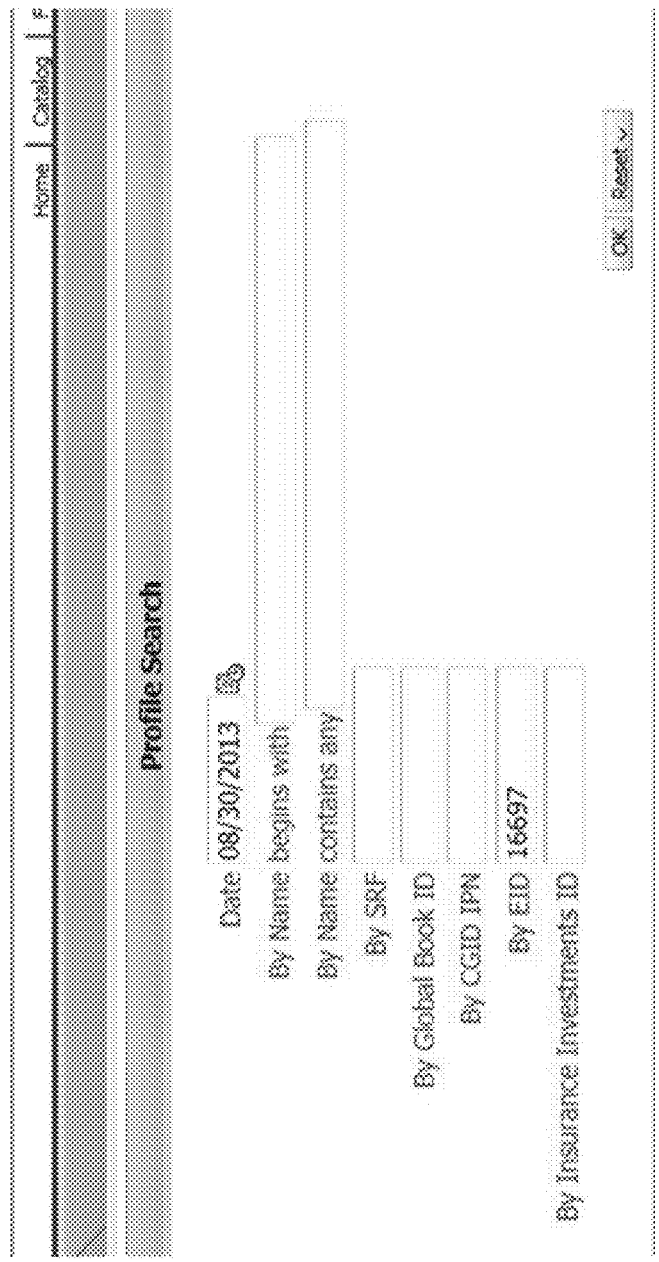
Figure 38:
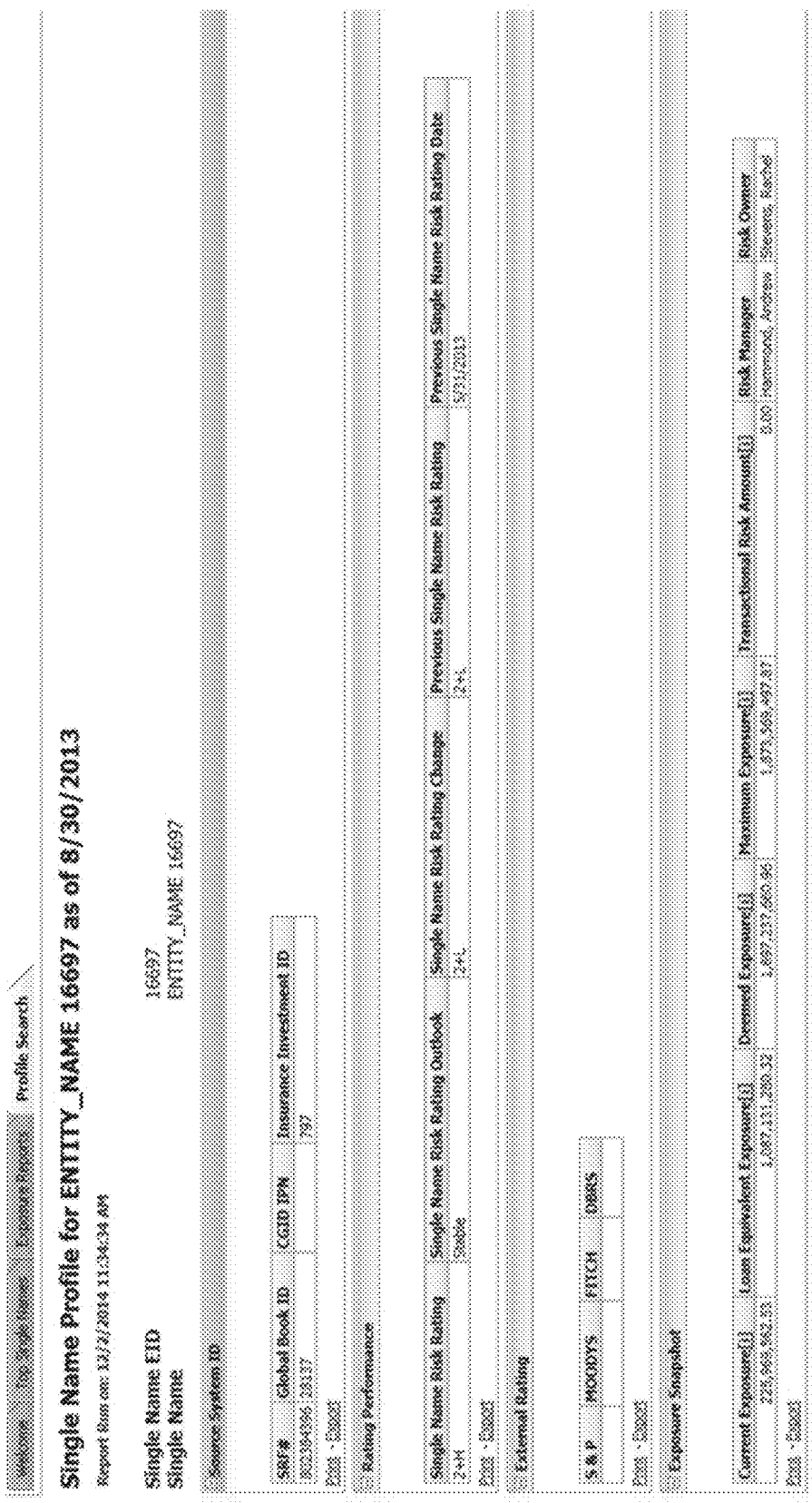
Figure 43:
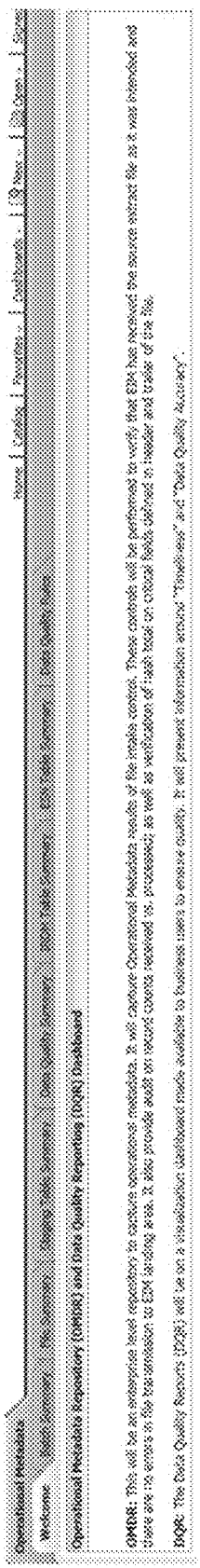
Figure 45:
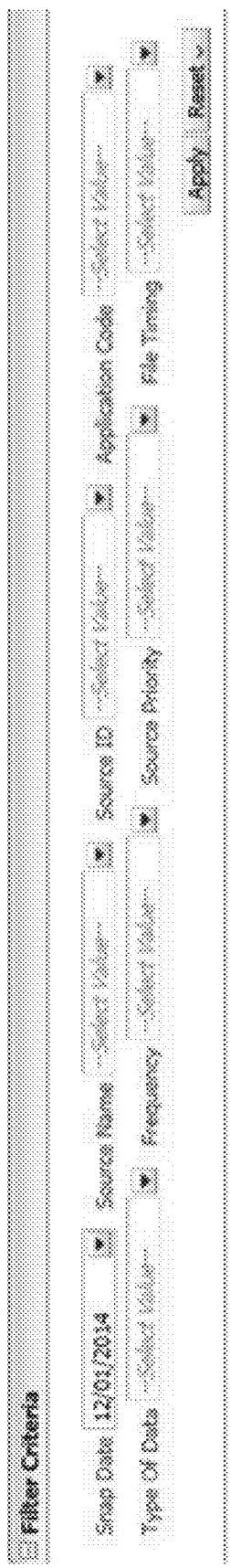
Figure 48:
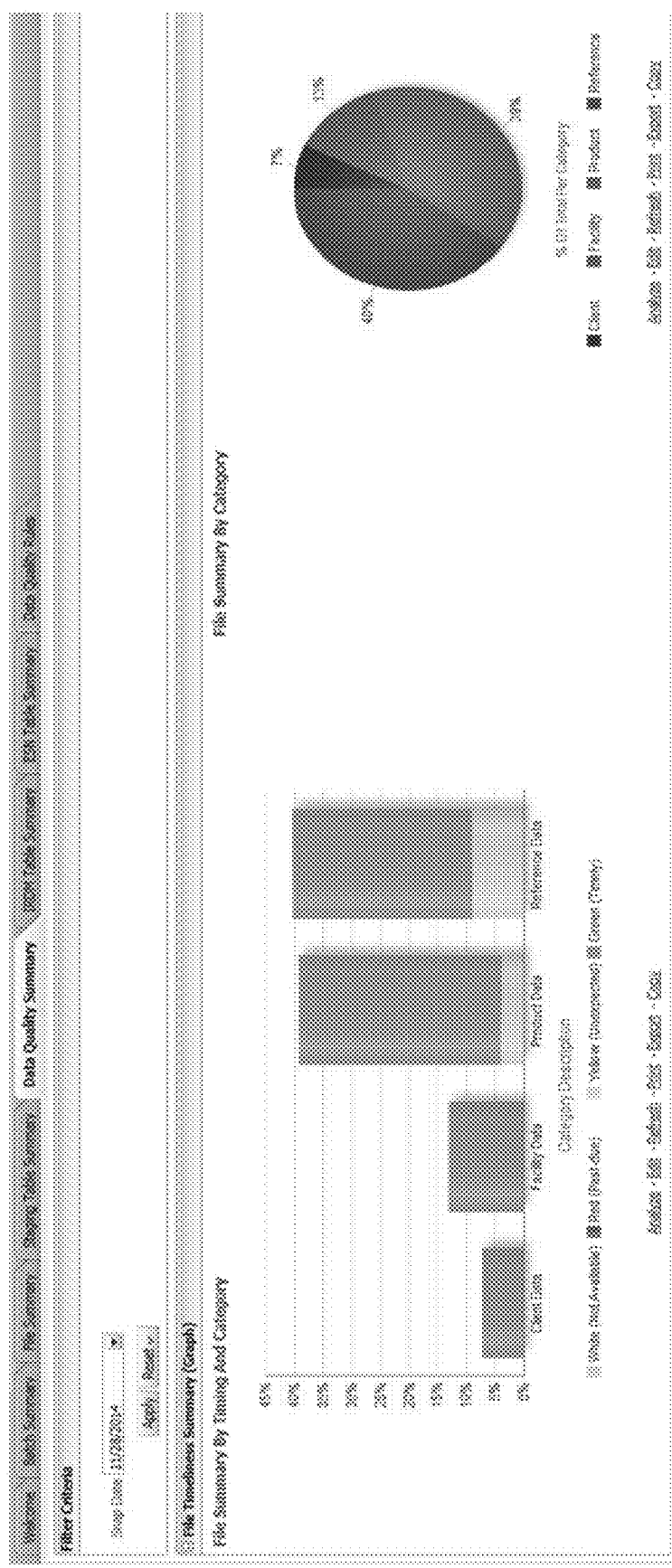
Figure 50:
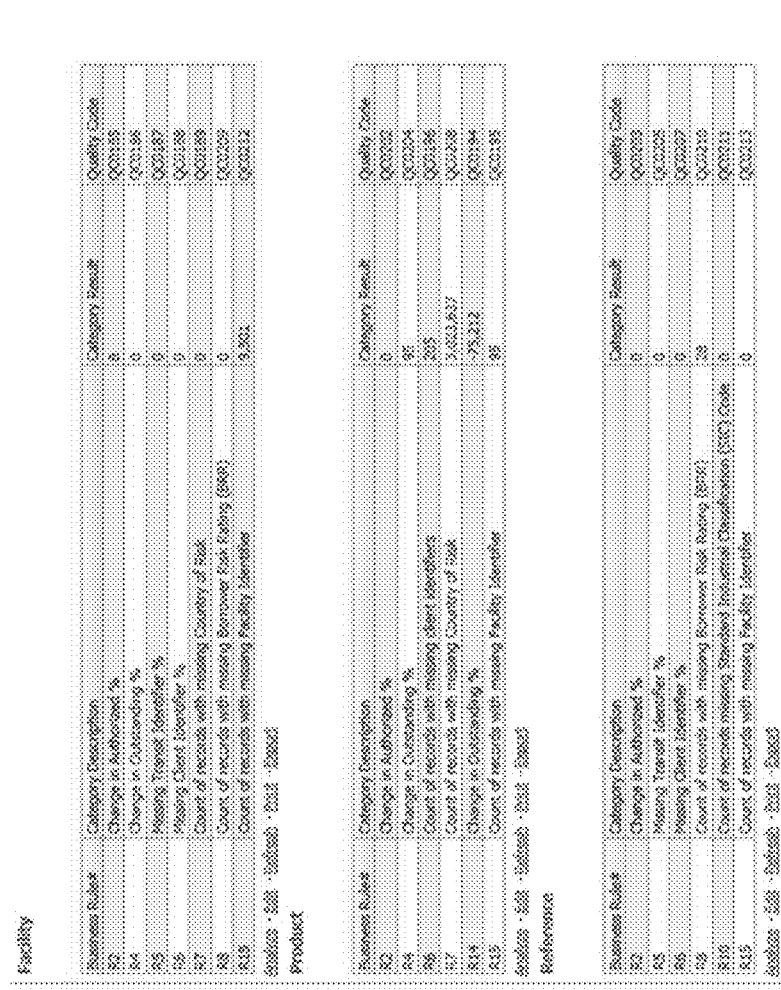

FIG. 11 is an example organization chart indicating credit authorizations of various entities and facilities, according to some embodiments.

The rule processes may be used to link facilities to different product arrangements using various business rules, such as those proprietary to a particular financial institution.

Where linkages cannot be found, unique facility numbers may be generated to link the product arrangements.

The data repository unit 112 may be configured to provide an enterprise data mart that supports various analytical tools and/or reporting at an enterprise level. The enterprise data mart may be configured so that business users may be able to access this data mart using various interfaces and/or applications, etc.

The data lineage unit 114 may be configured to maintain a the "data lineage" of each and every element from a source file to reports. The "data lineage" may be used, for example, to maintain the relationship between reporting information and source data such that it may be possible to determine the relationship and/or underpinning of a report element, despite the various transformations and/or adaptations of the source data. Such linkages may be maintained and updated in various metadata tags as reports are generated using the data. If the metadata is stored in the form of a linked matrix of metadata, it may be more readily accessible and traversable to track the "data lineage" of a particular data point that underlies a figure or calculation in a report. In some embodiments the data linage may constitute a link of hashed values so that linkages are not easily changeable.

This may be a non-trivial exercise as there may be multiple steps of transformation, aggregation, as well as modification to data prior to the data being in a state for inclusion in a report. The maintenance of the "data lineage" may help improve traceability of data from source to reports and similarly, from reports to source data.

For example, the mapping may also be integrated with program end-to-end and requirement documents.

For example a "data lineage" may been maintained by assigning a unique Data Element Number (DE #) to each field. These numbers and transformation logic may be maintained in, for example a data mapping stored on data storage 150.

The reporting/analytics unit 116 may be configured for the generation of various reports, and may provide, for example, an interface for a user to initiate the generation of reports (e.g., ad-hoc reports or canned reports), and run queries.

Reports, for example, may include a dashboard application on an interface that allows various views and runs to be performed based on data loaded on the data warehouse, and also based on the metadata tags stored indicative of quality and/or validation rules. Such a dashboard may include, for example, a showing of daily status available for: batch runs, staging database tables, files processed, data quality summary, final database table summaries, and data quality rules among others.

In some embodiments, a power user reporting interface is also available for ad-Hoc reports (users can build their own report from a list of tables and columns for in depth analysis or customized reporting). Specific formatting may be automatically applied based on the metadata tags, for example: conditional formatting (i.e. colour coding & applying of symbols) to highlight status of objects and daily process runs; and visualizations (pie charts, trend bar graphs) utilized to depict the trends and distributions of process runs.

A user may also be provided with the ability to filter the report results by customizing the following: run date, source name, application code, type of data (client, facility, product), frequency (on request, daily, weekly, monthly), source priority, status, etc. Reports can be downloaded in a variety of formats (MS Excel, PDF, CSV, MS Power Point, etc.)

The reports may, for example, be associated with the aggregate risk exposure of a particular portfolio based on information received from various sources, as well as stored relationships and/or the application of various business rules. The reports may be canned reports (e.g., a predetermined query), they may be ad-hoc reports (e.g., generated based on just-in-time query). The reports may be configured to be read and/or interpreted by a human. In some embodiments, reports may be configured to be transmitted to one or more external systems and/or recipients, for example, through a network or an application programmable interface.

The reporting/analytics unit 116 may be configured to provide various dashboards and/or user interface functionality such that a user may be able to view, analyze, interpret various elements of information organized into reports, and in some embodiments, the dashboards may be configured to allow a user to take various actions, such as initiate the re-running of data extraction, flag data for low data quality, review a "data lineage", etc.

The reporting/analytics unit 116 may be configured to provide data quality reports (DQR) that may be made available to business users to monitor the files timeliness, data quality and loading statuses.

For example, a "file summary" report may indicate the status of files arrival (timeliness) around the following parameters but are not limited to:
source name;
application id;
frequency;
priority;
last good file date;
expected as-of date;
actual as-of date;
file timings with summary message;
quality checks;
thresholds; and
data quality result.

There may be other reports configured, for example:
timeliness: This report may be configured to indicate whether the files were arrived on time/stale data/older than month; the data grouped by data type (client, product, reference etc.);

a "Table Summary" report may be configured to provide information about the data quality and accuracy. Details may be provided regarding the data quality checks performed on data;

the "Data Quality Summary" report may be configured to provide summary information about data quality and accuracy. For example, it may indicate total files received & processed successfully, total incorrect files & summary level DQ check results, for given data quality rules;

the "IR-DM Table Summary" report may be configured to provide information about IR-DM data mart table loading status;

the "Enterprise Table Summary" report may be configured to provide information about enterprise data mart tables loading status; and the "Data Quality Rules" report may be configured to provide about data quality rules applied with in various batch processes.

In some embodiments, the reporting/analytics unit 116 may be configured to provide reports based on the data itself, such as portfolio analytics, exposure reports (e.g., by country, by borrower, by facility type, by remaining term, by industry), and the reports may be provided at various levels of abstraction (e.g., aggregate level, individual bank level, individual trader level, individual portfolio level).

Reports may be ad-hoc and/or canned, and for example, a visualization environment may be provided using a tool.

The following list includes examples of types and subtypes of reports that may be generated:

I. Top Single Names [1]
  a. Top Single Names—Primary Industry [1]
  b. Top Single Names—Pro-rated Industry [2]
II. Exposure by Borrower [2]
  a. Exposure Reports—Borrower [3]
III. Exposure by BRR (Browser Risk Rating) [3]
  a. Exposure Reports—BRR [4]
  b. Exposure Reports—Two Period Exposure [5]
  c. Exposure Reports—BRR Distribution Chart [6]
  d. Portfolio Analytics—Exposure by BRR [7]
IV. Exposure by Country of Risk [4]
  a. Exposure Reports—Country of Risk [8]
  b. Portfolio Analytics—Country of Risk [9]
V. Exposure by Facility Remaining Term [5]
  a. Exposure Reports—Facility Remaining Term [10]
  b. Exposure Reports—Term Distribution Chart [11]
  c. Portfolio Analytics—Exposure by Facility Remaining Term [12]
VI. Exposure by Facility Risk Type [6]
  a. Exposure Reports—Facility Risk Type [13]
  b. Portfolio Analytics—Exposure by Facility Risk Type [14]
VII. Exposure by Facility Transit [7]
  a. Exposure Reports—Exposure BU [15]
  b. Portfolio Analytics—Two Period Comparisons [16]
  c. Portfolio Analytics—Exposure by Facility Transit [17]
VIII. Exposure by Industry [8]
  a. Exposure Reports—Industry [18]
  b. Portfolio Analytics—Exposure by Industry [19]
IX. Profile Search [9]
  a. Single Name Results [20]
  b. Client List Results [21]
  c. Single Name Profile [22]
  d. Client Profile [23]
  e. Source System ID [24]
  f. Rating performance [25]
  g. External Ratings [26]
  h. Single Name Exposure Summary [227]
  i. Single Name Responsibility Area [28]
  j. Single Name Limits [29]
  k. Single Name Country & Sector [30]
  l. Exposure By Tenor [31]
  m. Exposure By Borrower [32]
  n. Borrower Credit Risk [33]
  o. Transactional Risk [34]
  p. Approved Not Accepted Facilities [35]
  q. Client Profile Drill [36]

In some embodiments, the reporting/analytics unit 116 may be configured provide a more abstract view of corporate risk exposure for various entities (e.g., the corporate clients of a particular financial institution).

Aside from an entity's direct risk exposure captured daily from the system 100 potential risk exposure may exist, for example, in an entity's relationships with other entities and its employees' personal credit.

If a client becomes bankrupt, it will adversely impact other corporate clients and its employees' job prospects. These additional tiered risk exposure sources can significantly magnify a financial institution's exposure to a client.

Internal and external data sources may be used to build a tiered risk exposure analysis model. Internal data may refer to data that is stored by a financial institution, and external data sources may include data stored outside of the financial institution (e.g., credit information data, market event data, newsfeeds).

Internal client data, for example, may be used to match personal credit risk of employees of entities associated with a particular institution or combined with external data from social media, news sources, legal and financial documents, and other internet sources to discover business relationships between entities.

Internal Data Sources: The enterprise data warehouse may contain personal banking client data which may include, for example, credit applications with their employer's name. This name is matched against the names of enterprise entities to associate personal credit exposure to enterprise entities.

External Data Sources: Social media content and web pages may be retrieved from the Internet. Natural language processing (NLP) algorithms may be applied to this data to extract entities and relationships. Discovered entities and relationships may be further analyzed using Social Network Analysis (SNA) techniques and a probability model to identify the strength of the relationships.

In some embodiments, the reporting/analytics unit 116 may be configured to support various data visualizations, and the data visualizations may be used to provide decision support through, for example, allowing a user to quickly and easily determine trends relating to issues such as unwarranted risk exposure, data integrity issues, etc.

Network analysis techniques may be used to create a graph of corporate entities that are clients of a financial institution.

The graph consists of vertices and edges that represent entities and relationships. The sequence for building this graph is as follows: Extract and process semi-structured data from external sources and databases, entities discovery, relationship discovery, and data extraction and processing semi-structured data.

There may be various categories of external data sources, such as social media and news feeds and the second is from purchased data sources. Techniques such as parts-of-speech (PoS) tagging may be applied to a data set to identify parts of sentences for analysis. Metadata may also be maintained for establishing information quality.

There may be a step of entity discovery. Once the data is gathered and processed, named entity recognition may be applied using training data specific to the clients of a financial institution. The training data may, for example, consist of data from the enterprise data warehouse and external databases that contain data on known companies.

There may be a step of relationship discovery. A relationship between two entities may be derived based on relationship-facts. Each relationship-fact may consist of, for example, three main properties: source, type, and strength. The sources of the relationship-facts can be provided from, e.g., a purchased database, or extracted, e.g., from news articles. The type of a relationship-fact may include some of the following: supplier, customer, subsidiary, distributor, other or unknown. The strength of the relationship-fact, if available, may be represented as a dollar figure. For example, contracts between two entities may be separate relationship-facts with potentially different dollar figures.

The relationship-facts may then be aggregated to derive a single relationship between two entities. If sources contradict each other, a weighted system based on source metadata may be used to resolve conflict. When a conflict occurs, an analyst is also able to review the sources and decide which source to trust. Sources identified as trusted may be assigned a larger weight in future analysis.

Social network analysis techniques may also be applied to the completed network graph to extract, and/or understand information provided by the network graph.

For example, network analysis algorithms may be applied on the completed network graph to provide various insights. The algorithms to be used, may include but are not limited to the following: A customized PageRank algorithm to determine which entity poses the most risk exposure to a financial institution based on its 'single name' exposure, incoming relationships, outgoing relationships, quality of these relationships, and the PageRank score of these entities; clustering algorithms to discover potential components of entities that have strong relationships with each other; network resilience analysis to investigate the risk impact of entity or relationship failures.

In this risk model, a threshold for failure to each entity may be assigned. The threshold may be a fraction that represents the percentage of relationships an entity can lose before it fails. The threshold may be calculated based on the entity's number of relationships, strength of relationships, its credit rating, and industry. A failure is propagated throughout the network using this threshold. If an entity fails, all the relationships may be assumed to fail as well. A comparison of network size and assortativity (average degrees of neighboring entities) in different failure scenarios (random failure or multiple failures in one component) may be used to gauge the network's resiliency and identify critical entities.

Figure 7:
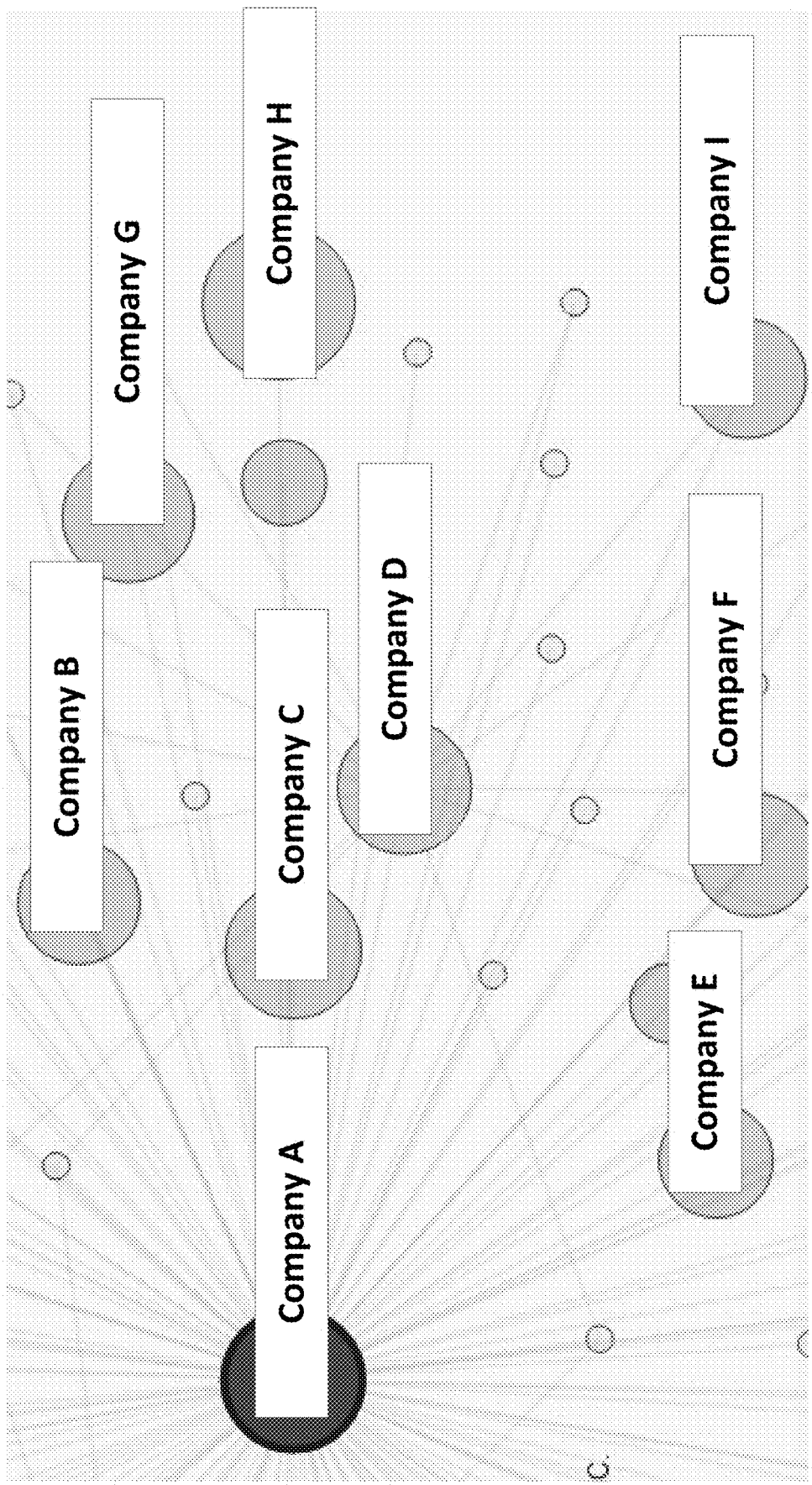
FIG. 7 illustrates a portion of an example SNA graph, according to some embodiments.

FIG. 7 illustrates a portion of an example SNA graph, according to some embodiments. Each circle may represent a matched entity in the system 100 that have a business relationship (supplier or distributor) with the company. Lines represent relationships. The shaded circles are entities that have risk exposure and small circles are entities that have no risk exposure. The shaded circles are shown for companies B-H, and the graph indicates relationships with Company A.

The data provisioning for downstream systems unit 118 may be configured for the manipulation, transformation and/or packaging of data and/or reports for use by external systems. For example, data may be formatted to suit a particular protocol, may be aggregated, segmented, etc.

Sample Screenshots

FIGS. 12-53 are screenshots of various interfaces and reports provided by the system, according to some embodiments. Exposure reports provided, for example, may be filtered and generated based on various inputs and/or query types, such as, top single name, exposure by borrower, exposure by browser risk rating, exposure by facility remaining term, exposure by two period variance, exposure by business unit, exposure by industry, exposure by country, exposure by facility, etc. Various graphs may be provided to visually illustrate data, such as graphs by risk type, browser risk rating, term charts, etc. Users may be able to conduct various types of searching, such as profile searches.

Other types of reports and interfaces may also be provided, such as batch summary reports, file summary reports, staging table summaries, data quality summaries, IRDM table summaries, single name table summaries, lists of data quality rules, etc.

General

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the following foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may be used in contexts beyond risk and/or exposure management.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Figure 8:
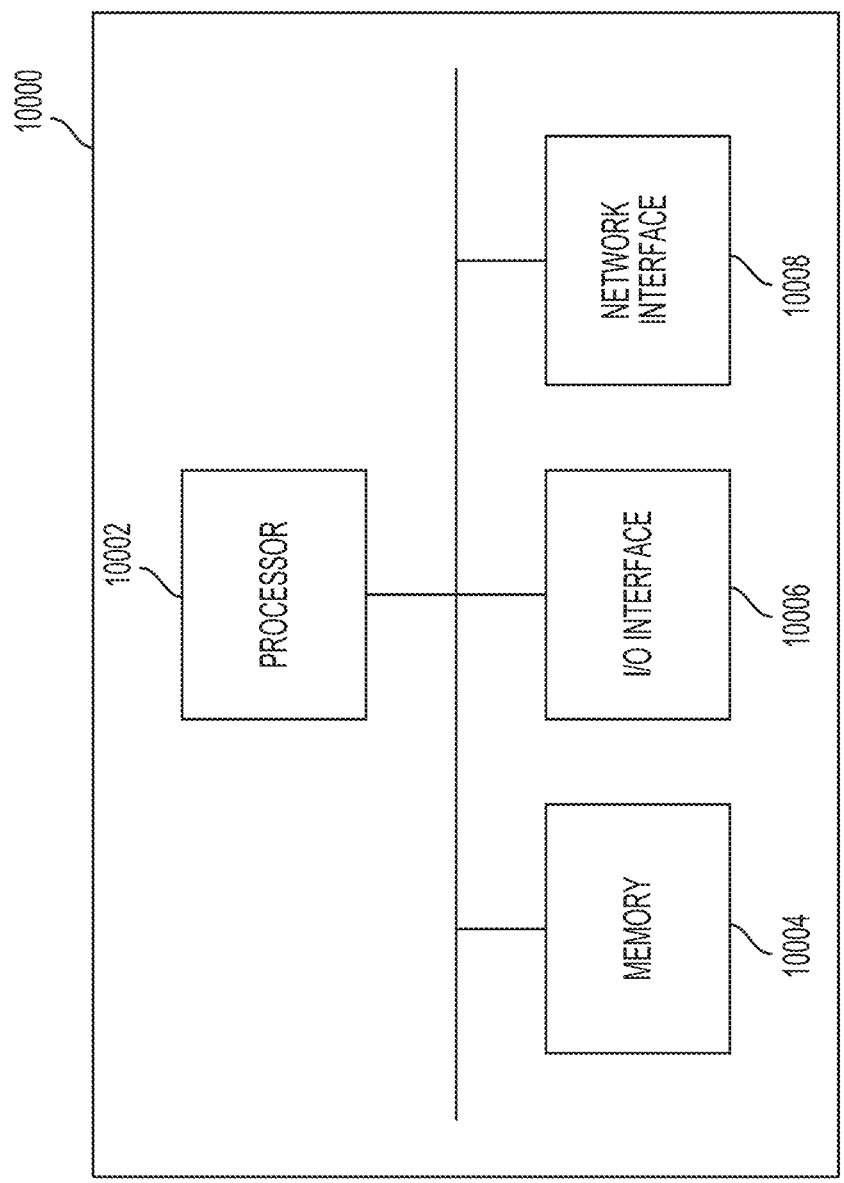
FIG. 8 is a schematic diagram of computing device for implementing the system, exemplary of an embodiment.

FIG. 8 is a schematic diagram of computing device for implementing system 100, exemplary of an embodiment. As depicted, computing device for implementing system 100 includes at least one processor 10002, memory 10004, at least one I/O interface 10006, and at least one network interface 10008.

For simplicity, only one computing device for implementing system 10000 is shown but system 10000 may include more computing devices for implementing system 10000 operable by users to access remote network resources and exchange data. The computing devices for implementing system 10000 may be the same or different types of devices. The computing device for implementing system 10000 at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing"). Potential benefits of using a cloud computing implementation may include the ability to increase scale and/or reactively and/or predictively provision/de-provision instances.

For example, and without limitation, the computing device may be a server, network appliance, embedded device, computer expansion module, personal computer, laptop, video display terminal, and wireless device or other computing device capable of being configured to carry out the methods described herein.

Each processor 10002 may be, for example, a microprocessor or microcontroller, a digital signal processing (DSP) processor, an integrated circuit, a field programmable gate array (FPGA), a reconfigurable processor, a programmable read-only memory (PROM), or any combination thereof.

Memory 10004 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 10006 enables computing device implementing system 10000 to interconnect with one or more input devices, such as a keyboard, mouse, camera, touch screen and a microphone, or with one or more output devices such as a display screen and a speaker.

Each network interface 10008 enables computing device implementing system 10000 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. W-Fi, WMAX), SS7 signaling network, fixed line, local area network, wide area network, and others, including any combination of these.

Computing device for implementing system 10000 is operable to register and authenticate users (using a login, unique identifier, and password for example) prior to providing access to applications, a local network, network resources, other networks and network security devices. Computing devices for implementing system 10000 may serve one user or multiple users.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate, processes, machines, manufacture, compositions of matter, means, methods, or steps, presently existing or later to be developed, that perform substantially the same function or achieve substantially the same result as the corresponding embodiments described herein may be utilized. Accordingly, some embodiments are intended to include within their scope such processes, machines, manufacture, compositions of matter, means, methods, or steps.

As can be understood, the examples described above and illustrated are intended to be exemplary only. The scope is indicated by the appended claims.

What is claimed is:
1. An apparatus comprising:
a computer including at least one processor, a data storage system, and at least one communication interface, the computer adapted for processing high volumes of data and generating insights within a pre-determined timeframe and providing:
the data storage system configured to maintain and store a set of metadata tags relating to a set of electronic data, the set of metadata tags including one or more metadata tags that are linked together to form a matrix structure that enables the generation of data integrity reports and enables automated decision making based on tracked data integrity;
a data acquisition and importation receiver configured to obtain, from a plurality of data streams associated with a plurality of data sources, the set of electronic data wherein two or more of the data streams arrive at different times and have different data quality characteristics;
the data acquisition and importation receiver further configured to receive a set of data processing rules, the set of data processing rules establishing one or more data validation conditions, each of the data validation conditions corresponding to at least one of the data streams or data sources;
a data integrity verification processor configured to, in real time, apply the set of data processing rules to the set of electronic data, by processing each datum of the set of electronic data to determine whether the one or more data validation conditions for the corresponding data stream or the corresponding data source is met;

the data integrity verification processor further configured to, upon a determination that one or more datum of the set of electronic data fails to meet at least one of the one or more data validation conditions, generate the one or more metadata tags indicative of low data quality linked to the one or more datum of the set of electronic data that fails to meet at least one of the one or more data validation conditions, and to store the one or more metadata tags on the data storage system;

the data integrity verification processor further configured to, upon a determination that one or more datum of the set of electronic data fails to meet at least one of the one or more data validation conditions, automatically initiate a bypass to load a corresponding datum obtained from a data storage maintaining prior sets of electronic data successfully loaded to the data storage system, the corresponding datum indicative of a last successfully loaded datum from a corresponding data stream of a data source from which the datum was obtained from in generating data integrity reports;

a batch processing control engine for generating and transmitting one or more control commands based at least on the matrix structure formed of the set of metadata tags, wherein the one or more control commands include machine-readable instructions adapted to load a subset of the electronic data into the data storage system, the subset of electronic data including only the data that is not linked with the one or more metadata tags indicative of low data quality, and wherein the one or more control commands further includes machine-readable instructions adapted to, for each datum of the set of electronic data that is linked with the one or more metadata tags indicative of low data quality, and an analytics engine configured for generating the one or more data integrity reports based at least on a processing of the matrix structure formed of the one or more metadata tags, the one or more data integrity reports including at least one or more recommendations for rectifying data integrity issues based at least on a traversal of the matrix structure; and an interface layer configured for displaying the one or more data integrity reports to one or more users.

2. The apparatus of claim 1, wherein the one or more data validation conditions include at least one of (i) a threshold to be met to establish data completeness, (ii) a set of required data objects, (iii) a matching hash checksum, (iv) a set of required data elements, (v) a set of required header information, (vi) a set of required data formatting requirements, and (vii) a specified time in which the datum should have received by the data acquisition and importation unit.

3. The apparatus of claim 1, wherein the data storage system is further configured to maintain a data inventory of expected electronic data from each of the plurality of data streams, and the one or more data validation conditions include comparing the received set of electronic data with the data inventory for ensuring that each datum of the set of electronic data from a corresponding data stream of the plurality of data streams is present.

4. The apparatus of claim 3, wherein the data inventory further includes at least one of (i) a set of required data objects, (ii) a matching hash checksum, (iii) a set of required data elements, (iv) a set of required header information, (v) a set of required data formatting requirements, or (vi) a specified time in which the datum should have received by the data acquisition and importation unit.

5. The apparatus of claim 1, wherein each metadata tag of the one or more metadata tags generated by the data integrity verification processor includes data elements representative of: (i) the one or more data validation conditions that the datum corresponding to the metadata tag failed to meet, (ii) the data stream from which the datum was obtained, or (iii) the data source from which the datum was obtained.

6. The apparatus of claim 5, wherein each metadata tag of the one or more metadata tags generated by the data integrity verification processor further includes a machine-readable instruction set including instructions for automatically requesting re-retrieval of the datum from the corresponding data source from which the data was initially obtained.

7. The apparatus of claim 1, further comprising an analytics unit adapted for generating one or more data integrity notifications based at least on a processing of the matrix structure formed of the one or more metadata tags.

8. The apparatus of claim 1, wherein the one or more control commands further includes machine-readable instructions adapted to, following the load of the subset of electronic data into the data storage system, transmit a request to the plurality of data sources requesting re-transmission of a second subset of electronic data, the second subset of electronic data including only the data that are linked with the one or more metadata tags indicative of low data quality.

9. The apparatus of claim 1, wherein the one or more data integrity reports include a listing of the subset of the electronic data into the data storage system loaded to the data storage system.

10. The apparatus of claim 1, wherein the one or more data integrity reports include a listing of the second subset of the electronic data, the second subset of electronic data including the data linked with the one or more metadata tags indicative of low data quality.

11. The apparatus of claim 1, wherein the one or more data integrity reports include both a listing of: (i) the subset of the electronic data and (ii) the second subset of the electronic data.

12. The apparatus of claim 11, wherein the interface layer is further configured to conditionally format one or more display icons representative of the second subset of the electronic data.

13. The apparatus of claim 11, wherein the interface layer is further configured to display electronic information stored in the one or more metadata tags.

14. The apparatus of claim 13, wherein the interface layer is further configured to display select supporting documentation in association with the electronic information stored in the one or more metadata tags, the supporting documentation selected from a data storage and including at least one of (i) when a next update from the corresponding data stream is expected; (ii) when a next update from the corresponding data source is expected, (iii) information identifying the corresponding data stream, (iv) information identifying the corresponding data source, (v) contact information related to the corresponding data source; (vi) a timestamp corresponding to the last successfully loaded datum; (vii) values associated with criticality of the data corresponding to the one or more the metadata tags.

15. A system for loading, extracting, and transforming data, the system comprising:

a computer including at least one processor, a data storage system, and at least one communication interface, the computer adapted for processing high volumes of data and generating insights within a pre-determined timeframe and providing:

a staging layer including:

a data storage system configured to maintain and store a set of metadata tags relating to a set of electronic data, the set of metadata tags including one or more metadata tags that are linked together to form a matrix structure that enables the generation of data integrity reports and to enable automated decision making based on tracked data integrity;

a data acquisition and importation receiver configured to obtain, from a plurality of data streams associated with a plurality of data sources, the set of electronic data wherein two or more of the data streams arrive at different times and have different data quality characteristics;

the data acquisition and importation receiver further configured to receiving a set of data processing rules, the set of data processing rules establishing one or more data validation conditions, each of the data validation conditions corresponding to at least one of the data streams or data sources;

a data integrity verification processor configured to, in real time, apply the set of data processing rules to the set of electronic data, by processing each datum of the set of electronic data to determine whether the one or more data validation conditions for the corresponding data stream is met;

the data integrity verification processor further configured to, upon a determination that one or more datum of the set of electronic data fails to meet at least one of the one or more data validation conditions, generate the one or more metadata tags indicative of low data quality linked to the one or more datum of the set of electronic data that fails to meet at least one of the one or more data validation conditions, and to store the one or more metadata tags on the data storage system;

a batch processing control engine configured to generate and transmit one or more control commands based at least on the matrix structure formed of the set of metadata tags; and the data storage system configured for, in accordance with the one or more control commands obtained batch processing control unit from the staging layer, loading a subset of the electronic data into data storage system, the subset of electronic data including only the data that is not linked with the one or more metadata tags indicative of low data quality, and for each datum of the set of electronic data that is linked with the one or more metadata tags indicative of low data quality, and loading a corresponding datum obtained from a data storage maintaining prior sets of electronic data successfully loaded to the data storage system, the corresponding datum indicative of a last successfully loaded datum from a corresponding data stream of a data source from which the datum was obtained from, and upon a determination that one or more datum of the set of electronic data fails to meet at least one of the one or more data validation conditions, automatically initiating a bypass to load a corresponding datum obtained from a data storage maintaining prior sets of electronic data successfully loaded to the data storage system, the corresponding datum indicative of a last successfully loaded datum from a corresponding data stream of a data source from which the datum was obtained from in generating data integrity reports, wherein the one or more control commands include machine-readable instructions adapted to load a subset of the electronic data into the data storage system, the subset of electronic data including only the data that is not linked with the one or more metadata tags indicative of low data quality, the one or more control commands further including machine-readable instructions adapted to, for each datum of the set of electronic data that is linked with the one or more metadata tags indicative of low data quality; and an analytics engine configured for generating the one or more data integrity reports based at least on a processing of the matrix structure formed of the one or more metadata tags, the one or more data integrity reports including at least one or more recommendations for rectifying data integrity issues based at least on a traversal of the matrix structure; and an interface layer configured for displaying the one or more data integrity reports to one or more users.

16. A method for processing high volumes of data and generating insights within a pre-determined timeframe, the method being performed on a processor coupled to non-transitory computer readable memories and data storage, the method comprising:

maintaining and storing a set of metadata tags relating to a set of electronic data, the set of metadata tags including one or more metadata tags that are linked together to form a matrix structure that enables the generation of data integrity reports and to enable automated decision making based on tracked data integrity;

obtaining, from a plurality of data streams associated with a plurality of data sources, the set of electronic data wherein two or more of the data streams arrive at different times and have different data quality characteristics;

receiving a set of data processing rules, the set of data processing rules establishing one or more data validation conditions, each of the data validation conditions corresponding to at least one of the data streams or data sources;

applying the set of data processing rules to the set of electronic data, by processing each datum of the set of electronic data to determine whether the one or more data validation conditions for the corresponding data stream is met;

upon a determination that one or more datum of the set of electronic data fails to meet at least one of the one or more data validation conditions, generating the one or more metadata tags indicative of low data quality linked to the one or more datum of the set of electronic data that fails to meet at least one of the one or more data validation conditions, and to store the one or more metadata tags on the data storage system;

upon a determination that one or more datum of the set of electronic data fails to meet at least one of the one or more data validation conditions, automatically initiating a bypass to load a corresponding datum obtained from a data storage maintaining prior sets of electronic data successfully loaded to the data storage system, the corresponding datum indicative of a last successfully loaded datum from a corresponding data stream of a data source from which the datum was obtained from in generating data integrity reports; and generating and transmitting one or more control commands based at least on the matrix structure formed of the set of metadata tags, wherein the one or more control commands include machine-readable instructions adapted to load a subset of the electronic data into a data storage system, the subset of electronic data including only the data that is not linked with the one or more metadata tags indicative of low data quality, and wherein the one or more control commands further includes machine-readable instructions adapted to, for each datum of the set of electronic data that is linked with the one or more metadata tags indicative of low data quality;

generating the one or more data integrity reports based at least on a processing of the matrix structure formed of the one or more metadata tags, the one or more data integrity reports including at least one or more recommendations for rectifying data integrity issues based at least on a traversal of the matrix structure; and controlling rendering display elements to display the one or more data integrity reports to one or more users.

* * * * *